US012461939B2

(12) United States Patent
Dageville et al.

(10) Patent No.: US 12,461,939 B2
(45) Date of Patent: Nov. 4, 2025

(54) DIRECTING REQUESTS TO DATABASES BASED ON CLIENT ACCOUNT ASSOCIATION

(71) Applicant: Snowflake Inc., Bozeman, MT (US)

(72) Inventors: Benoit Dageville, Foster City, CA (US);
Eric Robinson, Sammamish, WA (US);
Martin Hentschel, San Mateo, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/931,781

(22) Filed: Oct. 30, 2024

(65) Prior Publication Data

US 2025/0053576 A1  Feb. 13, 2025

Related U.S. Application Data

(63) Continuation of application No. 18/123,108, filed on Mar. 17, 2023, now Pat. No. 12,158,897, and a
(Continued)

(51) Int. Cl.
*G06F 16/00* (2019.01)
*G06F 16/245* (2019.01)
(Continued)

(52) U.S. Cl.
CPC .......... *G06F 16/273* (2019.01); *G06F 16/245* (2019.01); *H04L 67/1097* (2013.01)

(58) Field of Classification Search
CPC ...... G06F 16/25; G06F 16/27; G06F 16/2455; G06F 11/1448; G06F 16/217;
(Continued)

(56) References Cited

U.S. PATENT DOCUMENTS 7,353,231 B1   4/2008  Eslambolchi et al.
7,827,136 B1  11/2010  Wang et al.
(Continued)

OTHER PUBLICATIONS

Non-Final Office Action Correspondence of U.S. Appl. No. 16/700,958 mailed Mar. 7, 2024, 9 pages.
(Continued)

*Primary Examiner* — Yicun Wu
(74) *Attorney, Agent, or Firm* — Womble Bond Dickinson (US) LLP

(57) ABSTRACT

Systems of methods of directing requests to databases based on client account association is disclosed. A method includes determining a first client account associated with a first request to perform a first transaction. The method includes determining a second client account associated with a second request to perform a second transaction. The method includes selecting, for the first request, a primary deployment that stores a first dataset responsive to determining the
(Continued)

first client account associated with the first request. The method includes selecting, for the second request, a secondary deployment that stores a second dataset that includes the first dataset responsive to determining the second client account associated with the second request. The method includes executing, while the primary deployment and the secondary deployment are both available, the first transaction on the first dataset at the primary deployment and the second transaction on the second dataset at the secondary deployment.

30 Claims, 19 Drawing Sheets

Related U.S. Application Data continuation of application No. 17/703,804, filed on Mar. 24, 2022, now Pat. No. 11,630,845, which is a continuation of application No. 17/491,392, filed on Sep. 30, 2021, now Pat. No. 11,314,777, which is a continuation of application No. 16/392,258, filed on Apr. 23, 2019, now Pat. No. 11,151,161.

(60) Provisional application No. 62/694,656, filed on Jul. 6, 2018.

(51) Int. Cl.
*G06F 16/27* (2019.01)
*H04L 67/1097* (2022.01)

(58) Field of Classification Search
CPC ............ G06F 11/1464; G06F 11/1451; G06F 16/128; G06F 16/245; G06F 16/273
See application file for complete search history.

(56) References Cited

U.S. PATENT DOCUMENTS

| | | | |
|---|---|---|---|
| 10,503,427 B2 * | 12/2019 | Botes | G06F 11/1662 |
| 10,817,540 B2 | 10/2020 | Cruanes et al. | |
| 10,992,530 B2 | 4/2021 | Redkina et al. | |
| 2014/0032981 A1 | 1/2014 | Ahmed et al. | |
| 2016/0196320 A1 | 7/2016 | Borowiec et al. | |
| 2016/0246865 A1 | 8/2016 | Bourbonnais et al. | |
| 2018/0067822 A1 | 3/2018 | Mcalister et al. | |
| 2019/0102071 A1 | 4/2019 | Redkina et al. | |
| 2020/0012659 A1 | 1/2020 | Dageville et al. | |
| 2020/0104310 A1 | 4/2020 | Dageville et al. | |

OTHER PUBLICATIONS

Extended European Search Report of Application No. 23197819.8 mailed Jan. 3, 2024, 14 pages.

European Patent Office, European Search Report mailed on Feb. 1, 2021, for European Application No. 19830937.9.

Korean Intellectual Property Office, Notice of Preliminary Rejection mailed on Dec. 14, 2020, for Korean Patent Application No. 10-2020-7021622.

* cited by examiner

Importing a Snapshot Response
1100

Source deployment: dep1

Table T's active files:
- fdn11
- fdn13_g (dep0, fdn3)
- fdn15
- fdn16_g (dep0, fdn6)
- fdn18_g (dep2, fdn28)

Target deployment: dep2

Table T's active files:
- fdn21_g (dep1, fdn11)
- fdn23_g (dep0, fdn3)
- fdn25_g (dep1, fdn15)
- fdn26_g (dep0, fdn6)
- fdn28

FIG. 11

DIRECTING REQUESTS TO DATABASES BASED ON CLIENT ACCOUNT ASSOCIATION

CROSS-REFERENCE TO RELATED APPLICATIONS

This application is a continuation of U.S. patent application Ser. No. 18/123,108, filed Mar. 17, 2023, entitled "MANAGING DATABASE FAILOVER BASED ON TRANSACTION REQUEST TIME", which is a continuation of U.S. patent application Ser. No. 17/703,804, filed Mar. 24, 2022, entitled "DATA REPLICATION AND DATA FAILOVER IN DATABASE SYSTEMS", issued on Apr. 18, 2023, as U.S. Pat. No. 11,630,845, which is a continuation of U.S. patent application Ser. No. 17/491,392, filed Sep. 30, 2021, entitled "DATA REPLICATION AND DATA FAILOVER IN DATABASE SYSTEMS", issued on Jan. 20, 2022, as U.S. Pat. No. 11,314,777, which is a continuation of U.S. patent application Ser. No. 16/392,258, filed Apr. 23, 2019, entitled "DATA REPLICATION AND DATA FAILOVER IN DATABASE SYSTEMS", issued on Oct. 19, 2021 as U.S. Pat. No. 11,151,161, which claims the benefit of U.S. Provisional Application Ser. No. 62/694,656 entitled "SYSTEMS, METHODS, AND DEVICES FOR DATABASE REPLICATION," filed Jul. 6, 2018, the disclosures of which are incorporated herein by reference in their entirety, including but not limited to those portions that specifically appear hereinafter, the incorporation by reference being made with the following exception: In the event that any portion of the above-referenced provisional application is inconsistent with this application, this application supersedes said above-referenced provisional application.

TECHNICAL FIELD

The present disclosure relates to databases and more particularly relates to data replication and failover in database systems.

BACKGROUND

Databases are widely used for data storage and access in computing applications. A goal of database storage is to provide enormous sums of information in an organized manner so that it can be accessed, managed, and updated. In a database, data may be organized into rows, columns, and tables. Different database storage systems may be used for storing different types of content, such as bibliographic, full text, numeric, and/or image content. Further, in computing, different database systems may be classified according to the organization approach of the database. There are many different types of databases, including relational databases, distributed databases, cloud databases, object-oriented and others.

Databases are used by various entities and companies for storing information that may need to be accessed or analyzed. In an example, a retail company may store a listing of all sales transactions in a database. The database may include information about when a transaction occurred, where it occurred, a total cost of the transaction, an identifier and/or description of all items that were purchased in the transaction, and so forth. The same retail company may also store, for example, employee information in that same database that might include employee names, employee contact information, employee work history, employee pay rate, and so forth. Depending on the needs of this retail company, the employee information and the transactional information may be stored in different tables of the same database. The retail company may have a need to "query" its database when it wants to learn information that is stored in the database. This retail company may want to find data about, for example, the names of all employees working at a certain store, all employees working on a certain date, all transactions for a certain product made during a certain time frame, and so forth.

When the retail store wants to query its database to extract certain organized information from the database, a query statement is executed against the database data. The query returns certain data according to one or more query predicates that indicate what information should be returned by the query. The query extracts specific data from the database and formats that data into a readable form. The query may be written in a language that is understood by the database, such as Structured Query Language ("SQL"), so the database systems can determine what data should be located and how it should be returned. The query may request any pertinent information that is stored within the database. If the appropriate data can be found to respond to the query, the database has the potential to reveal complex trends and activities. This power can only be harnessed through the use of a successfully executed query.

Traditional database management requires companies to provision infrastructure and resources to manage the database in a data center. Management of a traditional database can be very costly and requires oversight by multiple persons having a wide range of technical skill sets. Traditional relational database management systems (RDMS) require extensive computing and storage resources and have limited scalability. Large sums of data may be stored across multiple computing devices. A server may manage the data such that it is accessible to customers with on-premises operations. For an entity that wishes to have an in-house database server, the entity must expend significant resources on a capital investment in hardware and infrastructure for the database, along with significant physical space for storing the database infrastructure. Further, the database may be highly susceptible to data loss during a power outage or other disaster situations. Such traditional database systems have significant drawbacks that may be alleviated by a cloud-based database system.

A cloud database system may be deployed and delivered through a cloud platform that allows organizations and end users to store, manage, and retrieve data from the cloud. Some cloud database systems include a traditional database architecture that is implemented through the installation of database software on top of a computing cloud. The database may be accessed through a Web browser or an application programming interface (API) for application and service integration. Some cloud database systems are operated by a vendor that directly manages backend processes of database installation, deployment, and resource assignment tasks on behalf of a client. The client may have multiple end users that access the database by way of a Web browser and/or API. Cloud databases may provide significant benefits to some clients by mitigating the risk of losing database data and allowing the data to be accessed by multiple users across multiple geographic regions.

There exist multiple architectures for traditional database systems and cloud database systems. One example architecture is a shared-disk system. In the shared-disk system, all data is stored on a shared storage device that is accessible from all processing nodes in a data cluster. In this type of system, all data changes are written to the shared storage device to ensure that all processing nodes in the data cluster access a consistent version of the data. As the number of processing nodes increases in a shared-disk system, the shared storage device (and the communication links between the processing nodes and the shared storage device) becomes a bottleneck slowing data read and write operations. This bottleneck is further aggravated with the addition of more processing nodes. Thus, existing shared-disk systems have limited scalability due to this bottleneck problem.

In some instances, it may be beneficial to replicate database data in multiple locations or on multiple storage devices. Replicating data can safeguard against system failures that may render data inaccessible over a cloud network and/or may cause data to be lost or permanently unreadable. Replicating database data can provide additional benefits and improvements as disclosed herein.

In light of the foregoing, disclosed herein are systems, methods, and devices for database replication.

BRIEF DESCRIPTION OF THE DRAWINGS

Non-limiting and non-exhaustive implementations of the present disclosure are described with reference to the following figures, wherein like reference numerals refer to like or similar parts throughout the various views unless otherwise specified. Advantages of the present disclosure will become better understood with regard to the following description and accompanying drawings where:

FIG. 11 illustrates the importation of a snapshot response in accordance with the teachings and principles of the disclosure;

DETAILED DESCRIPTION

Figure 1:
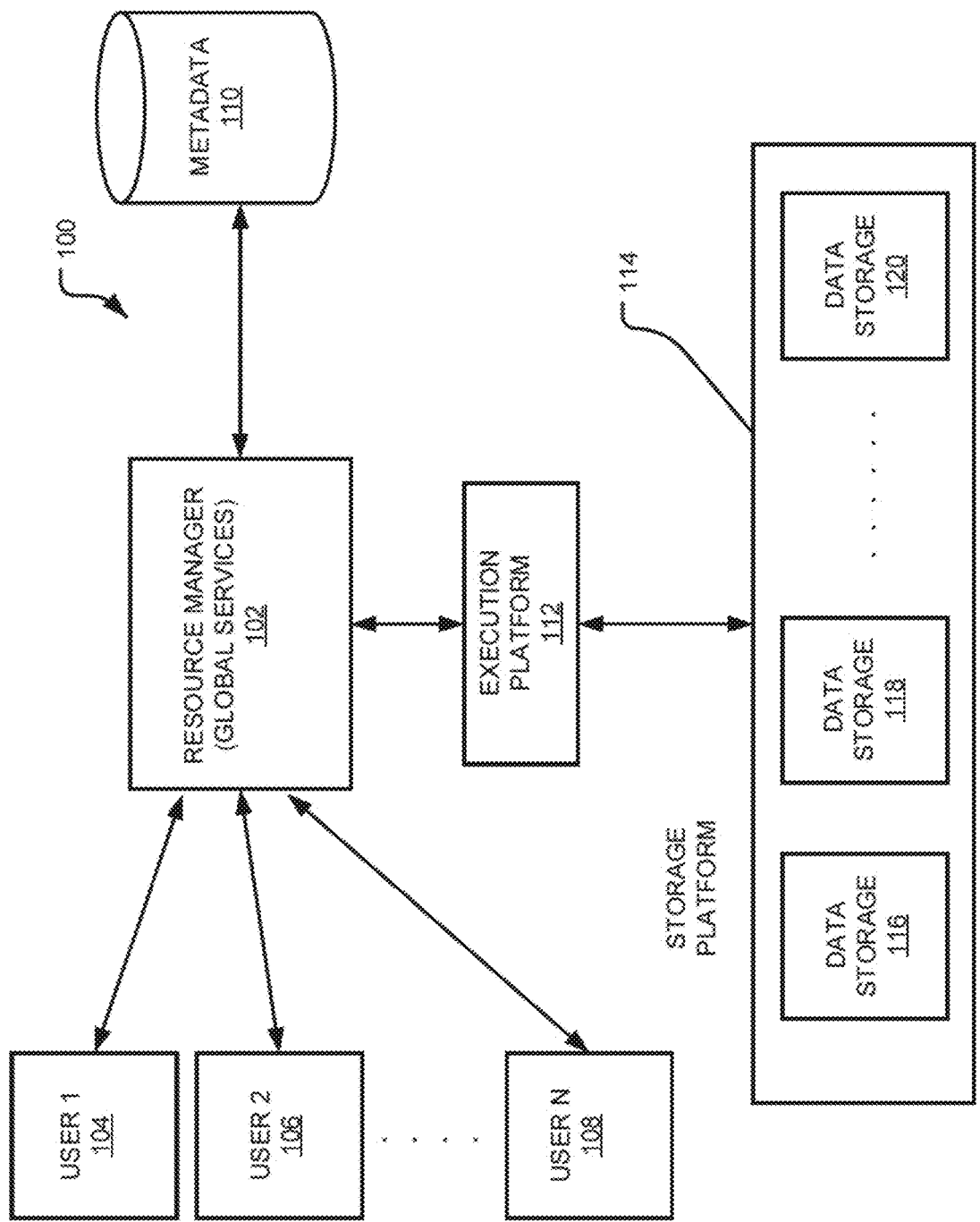
FIG. 1 illustrates a block diagram of components of a retrieval and data storage system in accordance with the teachings and principles of the disclosure.

Systems, methods, and devices for batch database replication and failover between multiple database deployments or database providers are disclosed herein. A system of the disclosure causes database data to be stored in a primary deployment and replicated in one or more secondary deployments. In the event that data in the primary deployment is unavailable, transactions may be executed on one or more of the secondary deployments. When the original primary deployment becomes available again, any transactions executed on secondary deployments may be propagated to the primary deployment. The system may be configured such that queries on the database data are executed on the primary deployment at any time when the primary deployment is available.

In some instances, it is desirable to replicate database data across multiple deployments. For some database clients, it is imperative that the data stored in any secondary deployments represents a non-stale and up-to-date copy of the data stored in the primary deployment. A replicated database can be desirable for purposes of disaster recovery. The one or more secondary deployments can serve as a standby to assume operations if the primary deployment fails or becomes otherwise unavailable. Additionally, a replicated database can be desirable for improving read performance. Read performance can be improved by routing a request to a deployment that is geographically nearest the client account to reduce total request processing latency. In light of the foregoing, the systems, methods, and devices disclosed herein provide means to generate and update a transactionally consistent copy of a primary deployment such that the one or more secondary deployments are synchronized with the primary deployment at all times.

In an embodiment, database data is replicated between a primary deployment and one or more secondary deployments. Further in an embodiment, a failover is executed from the primary deployment to a secondary deployment, and a failback may be executed from the secondary deployment back to the original primary deployment.

In an embodiment, a method for failing over database data between multiple deployments is disclosed. The method includes replicating database data stored in a primary deployment such that the database data is further stored in a secondary deployment. The method includes, in response to determining that the primary deployment is unavailable, executing one or more transactions on the database data at the secondary deployment. The method includes, in response to determining that the primary deployment is no longer unavailable, propagating the one or more transactions on the database data to the primary deployment. The method includes, while the primary deployment is available, executing queries on the database data at the primary deployment.

Database data may be stored in cloud based storage that is accessible across geographic regions. This cloud-based storage refers to database data that is stored at an off-site storage system that may be maintained by a third party in some implementations. For example, a client may elect to store data with a cloud storage provider rather than storing the data on a local computer hard drive or other local storage device owned by the client. The client may access the data by way of an Internet connection between the client's computing resources and the off-site storage resources that are storing the client's data. Cloud storage of database data may provide several advantages over traditional on-site local storage. When the database data is stored in cloud storage, the information may be accessed at any location that has an Internet connection. Therefore, a database client is not required to move physical storage devices or use the same computer to save, update, or retrieve database information. Further, the database information may be accessed, updated, and saved by multiple users at different geographic locations at the same time. The client may send copies of files over the Internet to a data server associated with the cloud storage provider, which records the files. The client may retrieve data by accessing the data server associated with the cloud storage provider by way of a Web-based interface or other user interface. The data server associated with the cloud storage provider may then send files back to the client or allow the client to access and manipulate the files on the data server itself.

Cloud storage systems typically include hundreds or thousands of data servers that may service multiple clients. Because computers occasionally require maintenance or repair, and because computers occasionally fail, it is important to store the same information on multiple machines. This redundancy may ensure that clients can access their data at any given time even in the event of a server failure.

In an embodiment of the disclosure, database data is stored across multiple cloud storage deployments. Such cloud storage deployments may be located in different geographic locations and the database data may be stored across multiple machines and/or servers in each of the deployments. The cloud storage deployments may be located in a single geographic location but may be connected to different power supplies and/or use different computing machines for storing data. The cloud storage deployments may be operated by different cloud storage providers. In such embodiments, the database data is replicated across the multiple deployments such that the database data may continue to be accessed, updated, and saved in the event that one deployment becomes unavailable or fails. In an embodiment, database data is stored in a primary deployment and is further stored in one or more secondary deployments. The primary deployment may be used for accessing, querying, and updating data at all times when the primary deployment is available. The one or more secondary deployments may assume operations if and when the primary deployment becomes unavailable. When the primary deployment becomes available again, the primary deployment may be updated with any changes that occurred on the one or more secondary deployments when the primary deployment was unavailable. The updated primary deployment may then resume operations, including accessing, querying, and updating data.

When data is stored across multiple deployments, it is important to ensure that the data is consistent across each of the deployments. When data is updated, modified, or added to a primary deployment, the updates may be propagated across the one or more secondary deployments to ensure that all deployments have a consistent and up-to-date version of the data. In the event that a primary deployment becomes unavailable, each of the up-to-date secondary deployments may assume operation of the data without the data being stale or incorrect. Further, when any of the multiple deployments becomes unavailable, the deployment may later be updated with all the changes that were made during the time when the deployment was unavailable. When the deployment is updated after being "offline" or unavailable, it may be beneficial to ensure that the deployment is updated with only those changes made during the time the deployment was unavailable.

Existing approaches to data replication are typically implemented through a snapshot strategy or a logging strategy. The snapshot strategy generates a serialized representation of the current state of the source database after there is a change made on the source database. The target database is then repopulated based on the snapshot and this occurs for every change made to the source database. The logging strategy begins with an initial (i.e. empty) database state and records a change made by each successful transaction against the source database. The sequence of changes defines the "transaction log" of the source database and each change in the transaction log is replayed in exactly the same order against the target database.

The snapshot strategy solves replication by taking a snapshot of the source database and instantiating the target database off the snapshot. However, with the snapshot strategy, producing or consuming a snapshot is roughly dependent on the size of the database as measured in the number of objects to replicate and potentially the number of byes stored. The snapshot strategy potentially requires an O (size of database) operation for each transaction to maintain an up-to-date target database. Performing an O (size of database) operation after each successful transaction on the source database may be impractical for all but small or relatively static databases.

The logging strategy attempts to solve the issues with the snapshot strategy by reducing the cost of propagating changes made by an individual transaction down to only roughly the size of the transaction itself. Performing an O (size of transaction) operation after every successful transaction that modifies the database can require fewer computing resources. However, the logging strategy requires a log record for every transaction applied to the source database since it was created in order to produce a replica target database. Performing an O (size of transaction log) operation in order to bootstrap a target database may be more expensive than bootstrapping off a snapshot. Additionally, the logging may be less resistant to bugs in the replication logic because bugs in replication logic can lead to inconsistency or drift between the source database and the target database. When drift occurs, it is imperative it be corrected as quickly as possible. If the bug is at the source database (i.e., in the production of log records), then it is already baked into the transaction log itself and this can be difficult to adjust or correct. Alternatively, if the bug is at the target database (i.e., in the consumption of log records), then the destination could be recreated by replaying the transaction log from the beginning, but this can require significant computing resources.

In certain implementations, neither of the snapshot strategy or the logging strategy is practical or viable for replicating database data. Disclosed herein is a hybrid strategy combining snapshots with a transaction log.

The hybrid approach for database replication disclosed herein combines the use of snapshots with the use of a transaction log. This approach disclosed herein enables transaction logging on the source database and enables periodic snapshot generation on the source database. The hybrid approach further performs initial instantiation on the target database based on the most recent snapshot of the source database. The hybrid approach includes replaying (post-snapshot) a transaction log record on the target database in the same order as it was applied on the source database. The hybrid approach further includes periodically refreshing the target database based on a newer snapshot and continues to apply post-snapshot transaction log records. As disclosed herein, the hybrid approach is configured to ensure that both log records and snapshots are available respectively and is further configured to keep initial bootstrapping time to a minimum to ensure that the initial target state is reasonably up-to-date with respect to the source database. The hybrid approach further enables a low-cost approach for bringing and keeping the target database up-to-date with the source database. The hybrid approach further enables rapid correction of drift as well as a fast-catch-up path for any replicas that may have fallen far behind the source due to, for example, replica downtime, service or networking hiccups leading to processing delays, and so forth.

In an embodiment, database data stored in a primary deployment is replicated such that the database data is further stored in a secondary deployment. The primary deployment may become unavailable due to, for example, a scheduled downtime for maintenance or updates, a power outage, a system failure, a data center outage, an error resulting in improper modification or deletion of database data, a cloud provider outage, and so forth. In response to the primary deployment becoming unavailable, one or more transactions on the database data are executed on the secondary deployment. The primary deployment may become available again and the one or more transactions that were executed on the secondary deployment are propagated to the primary deployment. Queries on the database data may be executed on the primary deployment when the primary deployment is available.

A database table may be altered in response to a Data Manipulation Language (DML) statement such as an insert command, a delete command, a merge command, and so forth. Such modifications may be referred to as a transaction that occurred on the database table (the modification may alternatively be referred to herein as an "update"). In an embodiment, each transaction includes a timestamp indicating when the transaction was received and/or when the transaction was fully executed. In an embodiment, a transaction includes multiple alterations made to a table, and such alterations may impact one or more micro-partitions in the table.

A database table may store data in a plurality of micro-partitions, wherein the micro-partitions are immutable storage devices. When a transaction is executed on a such a table, all impacted micro-partitions are recreated to generate new micro-partitions that reflect the modifications of the transaction. After a transaction is fully executed, any original micro-partitions that were recreated may then be removed from the database. A new version of the table is generated after each transaction that is executed on the table. The table may undergo many versions over a time period if the data in the table undergoes many changes, such as inserts, deletes, and/or merges. Each version of the table may include metadata indicating what transaction generated the table, when the transaction was ordered, when the transaction was fully executed, and how the transaction altered one or more rows in the table. The disclosed systems, methods, and devices for low-cost table versioning may be leveraged to provide an efficient means for generating a comprehensive change tracking summary that indicates all intermediate changes that have been made to a table between a first timestamp and a second timestamp. In an embodiment, the first timestamp indicates a time when a primary deployment becomes unavailable and the second timestamp indicates a time when the primary deployment returned to availability.

In an embodiment, all data in tables is automatically divided into an immutable storage device referred to as a micro-partition. The micro-partition may be considered a batch unit where each micro-partition has contiguous units of storage. By way of example, each micro-partition may contain between 50 MB and 500 MB of uncompressed data (note that the actual size in storage may be smaller because data may be stored compressed). Groups of rows in tables may be mapped into individual micro-partitions organized in a columnar fashion. This size and structure allow for extremely granular pruning of very large tables, which can be comprised of millions, or even hundreds of millions, of micro-partitions. Metadata may be automatically gathered about all rows stored in a micro-partition, including: the range of values for each of the columns in the micro-partition; the number of distinct values; and/or additional properties used for both optimization and efficient query processing. In one embodiment, micro-partitioning may be automatically performed on all tables. For example, tables may be transparently partitioned using the ordering that occurs when the data is inserted/loaded.

Querying the listing of intermediate modifications provides an efficient and low-cost means for determining a comprehensive listing of incremental changes made to a database table between two points in time. This is superior to methods known in the art where each of a series of subsequent table versions must be manually compared to determine how the table has been modified over time. Such methods known in the art require extensive storage resources and computing resources to execute.

In an embodiment, file metadata is stored within metadata storage. The file metadata contains table versions and information about each table data micro-partition. The metadata storage may include mutable storage (storage that can be over written or written in-place), such as a local file system, system, memory, or the like. In one embodiment, the micro-partition metadata consists of two data sets: table versions and micro-partition information. The table versions data set includes a mapping of table versions to lists of added micro-partitions and removed micro-partitions. Micro-partition information consists of information about data within the micro-partition, including micro-partition path, micro-partition size, micro-partition key id, and summaries of all rows and columns that are stored in the micro-partition, for example. Each modification of the table creates new micro-partitions and new micro-partition metadata. Inserts into the table create new micro-partitions. Deletes from the table remove micro-partitions and potentially add new micro-partitions with the remaining rows in a table if not all rows in a micro-partition were deleted. Updates remove micro-partitions and replace them with new micro-partitions with rows containing the changed records.

In one embodiment, metadata may be stored in metadata micro-partitions in immutable storage. In one embodiment, a system may write metadata micro-partitions to cloud storage for every modification of a database table. In one embodiment, a system may download and read metadata micro-partitions to compute the scan set. The metadata micro-partitions may be downloaded in parallel and read as they are received to improve scan set computation. In one embodiment, a system may periodically consolidate metadata micro-partitions in the background. In one embodiment, performance improvements, including pre-fetching, caching, columnar layout and the like may be included. Furthermore, security improvements, including encryption and integrity checking, are also possible with metadata files with a columnar layout.

In an embodiment, the initialization and maintenance of a replica is implemented via a combination of database snapshot production/consumption and transaction log record production/consumption. A replica may be generated from a snapshot and applied to individual transaction records incrementally such that the replica is synchronized with the source database. In an embodiment, the replica is periodically refreshed based on a snapshot even if the replica is considered up-to-date based on incremental transaction updates. The period refresh based on the snapshot may address issues of drift due to bugs and other issues. In an embodiment, snapshots and transaction log records are written to remote storage for cross-deployment visibility. Modifications to transaction processing infrastructure may be utilized to ensure transactional consistency between the source database transaction state and the appearance of transaction log records in remote storage. In an embodiment, modifications to Data Definition Language (DDL) processing logic may be integrated into a transaction processing workflow to ensure consistency of DDL application and the appearance of the transaction log record in remote storage.

In the following description of the disclosure, reference is made to the accompanying drawings, which form a part hereof, and in which is shown by way of illustration specific implementations in which the disclosure may be practices. It is understood that other implementations may be utilized, and structural changes may be made without departing from the scope of the disclosure.

In describing and claiming the disclosure, the following terminology will be used in accordance with the definitions set out below.

It must be noted that, as used in this specification and the appended claims, the singular forms "a," "an," and "the" include plural referents unless the context clearly dictates otherwise.

Reference throughout this specification to "one embodiment," "an embodiment," "one implementation," "an implementation," "one example," or "an example" means that a particular feature, structure, or characteristic described in connection with the embodiment, implementation, or example is included in at least one embodiment of the present disclosure. Thus, appearances of the above-identified phrases in various places throughout this specification are not necessarily all referring to the same embodiment, implementation, or example. In addition, it should be appreciated that the figures provided herewith are for explanation purposes to persons ordinarily skilled in the art.

As used herein, the terms "comprising," "including," "containing," and grammatical equivalents thereof are inclusive or open-ended terms that do not exclude additional, unrecited elements or method steps.

As used herein, "table" is defined as a collection of records (rows). Each record contains a collection of values of table attributes (columns). Tables are typically physically stored in multiple smaller (varying size or fixed size) storage units, e.g. files or blocks.

As used herein, "partitioning" is defined as physically separating records with different data to separate data partitions. For example, a table can partition data based on the country attribute, resulting in a per-country partition.

Embodiments in accordance with the present disclosure may be embodied as an apparatus, method or computer program product. Accordingly, the present disclosure may take the form of an entirely hardware-comprised embodiment, an entirely software-comprised embodiment (including firmware, resident software, micro-code, etc.) or an embodiment combining software and hardware aspects that may all generally be referred to herein as a "circuit," "module" or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random-access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The systems and methods described herein may operate on a flexible and scalable data warehouse using a new data processing platform. In some embodiments, the described systems and methods leverage a cloud infrastructure that supports cloud-based storage resources, computing resources, and the like. Example cloud-based storage resources offer significant storage capacity available on-demand at a low cost. Further, these cloud-based storage resources may be fault-tolerant and highly scalable, which can be costly to achieve in private data storage systems. Example cloud-based computing resources are available on-demand and may be priced based on actual usage levels of the resources. Typically, the cloud infrastructure is dynamically deployed, reconfigured, and decommissioned in a rapid manner.

In the described systems and methods, a data storage system utilizes an SQL (Structured Query Language)-based relational database. However, these systems and methods are applicable to any type of database, and any type of data storage and retrieval platform, using any data storage architecture and using any language to store and retrieve data within the data storage and retrieval platform. The systems and methods described herein further provide a multi-tenant system that supports isolation of computing resources and data between different customers/clients and between different users within the same customer/client.

Referring now to FIG. 1, a computer system is illustrated for running the methods disclosed herein. As shown in FIG. 1, resource manager 102 may be coupled to multiple users 104, 106, and 108. In particular implementations, resource manager 102 can support any number of users desiring access to data processing platform 100. Users 104, 106, 108 may include, for example, end users providing data storage and retrieval requests, system administrators managing the systems and methods described herein, and other components/devices that interact with resource manager 102.

Resource manager 102 provides various services and functions that support the operation of all systems and components within data processing platform 100. Resource manager 102 may be coupled to metadata 110, which is associated with the entirety of data stored throughout data processing platform 100. In some embodiments, metadata 110 may include a summary of data stored in remote data storage systems as well as data available from a local cache. Additionally, metadata 110 may include information regarding how data is organized in the remote data storage systems and the local caches. Metadata 110 may allow systems and services to determine whether a piece of data needs to be processed without loading or accessing the actual data from a storage device.

Resource manager 102 may be further coupled to the execution platform 112, which provides multiple computing resources that execute various data storage and data retrieval tasks, as discussed in greater detail below. Execution platform 112 may be coupled to multiple data storage devices 116, 118, and 120 that are part of a storage platform 114. Although three data storage devices 116, 118, and 120 are shown in FIG. 1, execution platform 112 is capable of communicating with any number of data storage devices. In some embodiments, data storage devices 116, 118, and 120 are cloud-based storage devices located in one or more geographic locations. For example, data storage devices 116, 118, and 120 may be part of a public cloud infrastructure or a private cloud infrastructure. Data storage devices 116, 118, and 120 may be hard disk drives (HDDs), solid state drives (SSDs), storage clusters or any other data storage technology. Additionally, storage platform 114 may include distributed file systems (such as Hadoop Distributed File Systems (HDFS)), object storage systems, and the like.

In particular embodiments, the communication links between resource manager 102 and users 104, 106, 108, metadata 110, and execution platform 112 are implemented via one or more data communication networks. Similarly, the communication links between execution platform 112 and data storage devices 116, 118, 120 in storage platform 114 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 1, data storage devices 116, 118, and 120 are decoupled from the computing resources associated with execution platform 112. This architecture supports dynamic changes to data processing platform 100 based on the changing data storage/retrieval needs as well as the changing needs of the users and systems accessing data processing platform 100. The support of dynamic changes allows data processing platform 100 to scale quickly in response to changing demands on the systems and components within data processing platform 100. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

Resource manager 102, metadata 110, execution platform 112, and storage platform 114 are shown in FIG. 1 as individual components. However, each of resource manager 102, metadata 110, execution platform 112, and storage platform 114 may be implemented as a distributed system (e.g., distributed across multiple systems/platforms at multiple geographic locations). Additionally, each of resource manager 102, metadata 110, execution platform 112, and storage platform 114 can be scaled up or down (independently of one another) depending on changes to the requests received from users 104, 106, 108 and the changing needs of data processing platform 100. Thus, data processing platform 100 is dynamic and supports regular changes to meet the current data processing needs.

Figure 2:
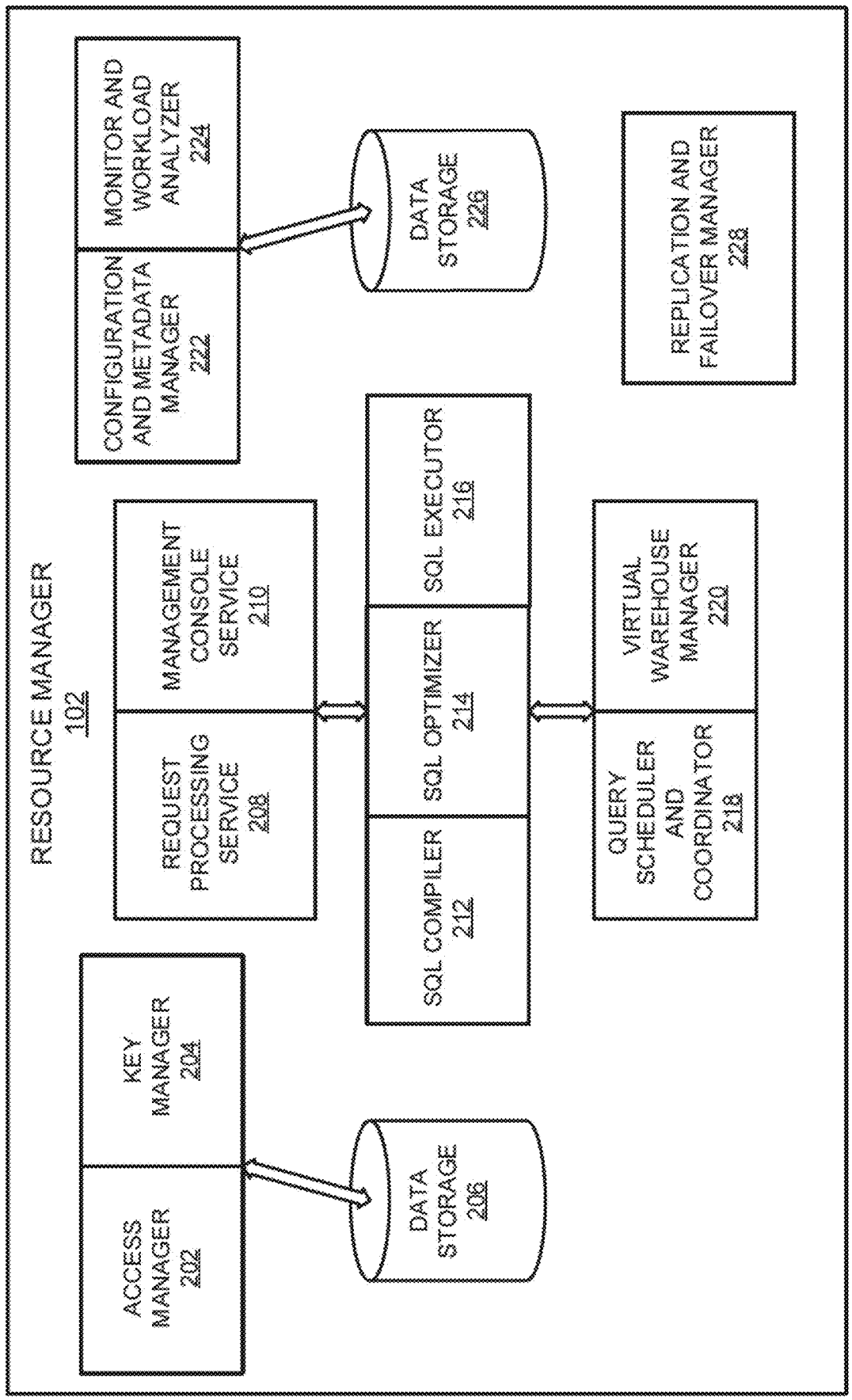
FIG. 2 illustrates a block diagram depicting an embodiment of a resource manager in accordance with the teachings and principles of the disclosure.

FIG. 2 is a block diagram depicting an embodiment of resource manager 102. As shown in FIG. 1, resource manager 102 includes an access manager 202 and a key manager 204 coupled to a data storage device 206. Access manager 202 may handle authentication and authorization tasks for the systems described herein. Key manager 204 may manage storage and authentication of keys used during authentication and authorization tasks. A request processing service 208 manages received data storage requests and data retrieval requests. A management console service 210 supports access to various systems and processes by administrators and other system managers.

Resource manager 102 may also include an SQL compiler 212, an SQL optimizer 214 and an SQL executor 210. SQL compiler 212 parses SQL queries and generates the execution code for the queries. SQL optimizer 214 determines the best method to execute queries based on the data that needs to be processed. SQL executor 216 executes the query code for queries received by resource manager 102. A query scheduler and coordinator 218 may send received queries to the appropriate services or systems for compilation, optimization, and dispatch to the execution platform 112. A virtual warehouse manager 220 manages the operation of multiple virtual warehouses implemented in an execution platform.

Additionally, resource manager 102 includes a configuration and metadata manager 222, which manages the information related to the data stored in the remote data storage devices and in the local caches. A monitor and workload analyzer 224 oversees the processes performed by resource manager 102 and manages the distribution of tasks (e.g., workload) across the virtual warehouses and execution nodes in the execution platform. Configuration and metadata manager 222 and monitor and workload analyzer 224 are coupled to a data storage device 226.

Resource manager 102 also includes a replication and failover manager 228, which manages data replication requests, database failover, and database fail back. For example, replication and failover manager 228 manages and schedules batch data replication between multiple database storage resources and database deployments. In an embodiment, the replication and failover manager 228 may manage the replication of data stored within a primary deployment to be replication within one or more secondary or backup deployments. Further, the replication and failover manger 228 may manage the shifting of database operations from a primary deployment to a secondary deployment when the primary deployment fails and/or may manage the shifting of database operations from the secondary deployment back to the primary deployment when the primary deployment becomes available again. The replication and failover manager 228 may ensure consistent data replication between the multiple deployments and may further ensure that any updates made to a first deployment while a second deployment is unavailable are propagated to the second deployment when the second deployment becomes available again.

Figure 3:
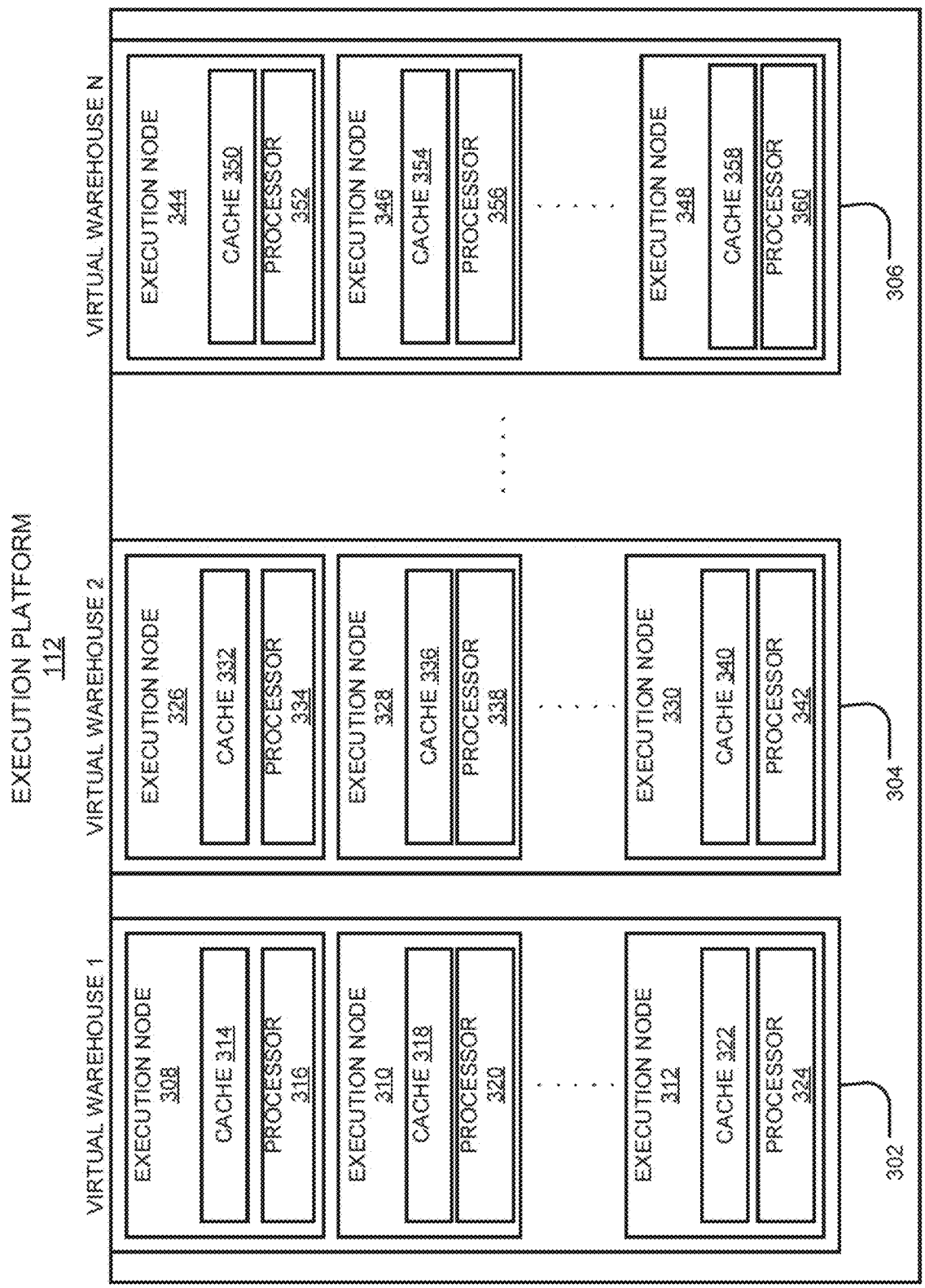
FIG. 3 illustrates a block diagram depicting an embodiment of an execution platform in accordance with the teachings and principles of the disclosure.

FIG. 3 is a block diagram depicting an embodiment of an execution platform. As shown in FIG. 3, execution platform 112 includes multiple virtual warehouses 302, 304, and 306. Each virtual warehouse includes multiple execution nodes that each includes a cache and a processor. Although each virtual warehouse 302, 304, 306 shown in FIG. 3 includes three execution nodes, a particular virtual warehouse may include any number of execution nodes without departing from the scope of the disclosure. Further, the number of execution nodes in a virtual warehouse is dynamic, such that new execution nodes are created when additional demand is present, and existing execution nodes are deleted when they are no longer necessary.

Each virtual warehouse 302, 304, 306 is capable of accessing any of the data storage devices 116, 118, 120 shown in FIG. 1. Thus, virtual warehouses 302, 304, 306 are not necessarily assigned to a specific data storage device 116, 118, 120 and, instead, can access data from any of the data storage devices 116, 118, 120. Similarly, each of the execution nodes shown in FIG. 3 can access data from any of the data storage devices 116, 118, 120. In some embodiments, a particular virtual warehouse or a particular execution node may be temporarily assigned to a specific data storage device, but the virtual warehouse or execution node may later access data from any other data storage device.

In the example of FIG. 3, virtual warehouse 302 includes three execution nodes 308, 310, and 312. Execution node 308 includes a cache 314 and a processor 316. Execution node 310 includes a cache 318 and a processor 320. Execution node 312 includes a cache 322 and a processor 324. Each execution node 308, 310, 312 is associated with processing one or more data storage and/or data retrieval tasks. For example, a particular virtual warehouse may handle data storage and data retrieval tasks associated with a particular user or customer. In other implementations, a particular virtual warehouse may handle data storage and data retrieval tasks associated with a particular data storage system or a particular category of data.

Similar to virtual warehouse 302 discussed above, virtual warehouse 304 includes three execution nodes 326, 328, and 330. Execution node 326 includes a cache 332 and a processor 334. Execution node 328 includes a cache 336 and a processor 338. Execution node 330 includes a cache 340 and a processor 342. Additionally, virtual warehouse 306 includes three execution nodes 344, 346, and 348. Execution node 344 includes a cache 350 and a processor 352. Execution node 346 includes a cache 354 and a processor 356. Execution node 348 includes a cache 358 and a processor 360.

Although the execution nodes shown in FIG. 3 each include one cache and one processor, alternative embodiments may include execution nodes containing any number of processors and any number of caches. Additionally, the caches may vary in size among the different execution nodes. The caches shown in FIG. 3 store, in the local execution node, data that was retrieved from one or more data storage devices in a storage platform 114 (see FIG. 1). Thus, the caches reduce or eliminate potential bottleneck problems occurring in platforms that consistently retrieve data from remote storage systems. Instead of repeatedly accessing data from the remote storage devices, the systems and methods described herein access data from the caches in the execution nodes which is significantly faster and avoids the bottleneck problem. In some embodiments, the caches are implemented using high-speed memory devices that provide fast access to the cached data. Each cache can store data from any of the storage devices in storage platform 114.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, a particular execution node may be assigned more processing resources if the tasks performed by the execution node become more processor intensive. Similarly, an execution node may be assigned more cache resources if the tasks performed by the execution node require a larger cache capacity.

Although virtual warehouses 302, 304, 306 are associated with the same execution platform 112 of FIG. 1, the virtual warehouses may be implemented using multiple computing systems at multiple geographic locations. For example, virtual warehouse 302 can be implemented by a computing system at a first geographic location, while virtual warehouses 304 and 306 are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, a particular instance of virtual warehouse 302 implements execution nodes 308 and 310 on one computing platform at a particular geographic location and implements execution node 312 at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse. Execution platform 112 is also fault tolerant. For example, if one virtual warehouse fails, that virtual warehouse is quickly replaced with a different virtual warehouse at a different geographic location.

A particular execution platform 112 may include any number of virtual warehouses 302, 304, 306. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

Figure 4:
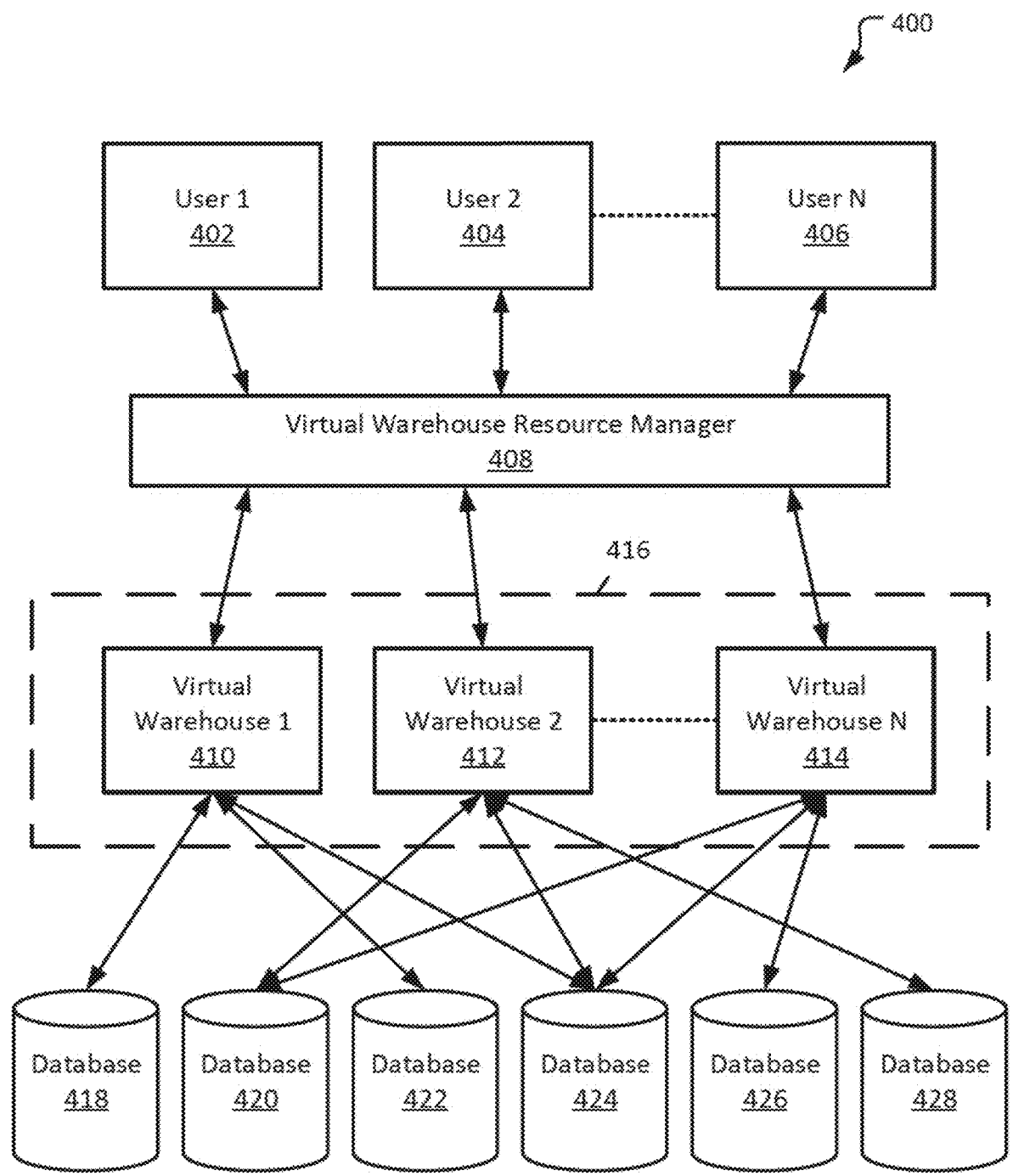
FIG. 4 illustrates a block diagram of components of an operating environment in accordance with the teachings and principles of the disclosure.

FIG. 4 is a block diagram depicting an embodiment of an operating environment 400 with multiple users accessing multiple databases through a load balancer and multiple virtual warehouses contained in a virtual warehouse group. Environment 400 includes a virtual warehouse resource manager 408 and multiple virtual warehouses 410, 412, and 414 arranged in a virtual warehouse group 416. Virtual warehouse resource manager 408 may be contained in resource manager 102. In particular, multiple users 402, 404, and 406 access multiple databases 418, 420, 422, 424, 426, and 428 through virtual warehouse resource manager 408 and virtual warehouse group 416. In some embodiments, users 402-406 access virtual warehouse resource manager 408 through resource manager 102 (FIG. 1). In some embodiments, virtual warehouse resource manager 408 is implemented within resource manager 102.

Users 402-406 may submit data retrieval and data storage requests to virtual warehouse resource manager 408, which routes the data retrieval and data storage requests to an appropriate virtual warehouse 410-414 in virtual warehouse group 416. In some implementations, virtual warehouse resource manager 408 provides a dynamic assignment of users 402-406 to virtual warehouses 410-414. When submitting a data retrieval or data storage request, users 402-406 may specify virtual warehouse group 416 to process the request without specifying the particular virtual warehouse 410-414 that will process the request. This arrangement allows virtual warehouse resource manager 408 to distribute multiple requests across the virtual warehouses 410-414 based on efficiency, available resources, and the availability of cached data within the virtual warehouses 401-414. When determining how to route data processing requests, virtual warehouse resource manager 408 considers available resources, current resource loads, number of current users, and the like.

In some embodiments, fault tolerance systems create new virtual warehouses in response to a failure of a virtual warehouse. The new virtual warehouse may be in the same virtual warehouse group or may be created in a different virtual warehouse group at a different geographic location.

Each virtual warehouse 410-414 is configured to communicate with a subset of all databases 418-428. For example, in environment 400, virtual warehouse 410 is configured to communicate with databases 418, 420, and 422. Similarly, virtual warehouse 412 is configured to communicate with databases 420, 424, and 426. And, virtual warehouse 414 is configured to communicate with databases 422, 426, and 428. In alternate embodiments, virtual warehouses 410-414 may communicate with any (or all) of the databases 418-428.

Although environment 400 shows one virtual warehouse group 416, alternate embodiments may include any number of virtual warehouse groups, each associated with any number of virtual warehouses. For example, different virtual warehouses may be created for each customer or group of users. Additionally, different virtual warehouses may be created for different entities, or any other group accessing different data sets. Multiple virtual warehouse groups may have different sizes and configurations. The number of virtual warehouse groups in a particular environment is dynamic and may change based on the changing needs of the users and other systems in the environment.

Figure 5:
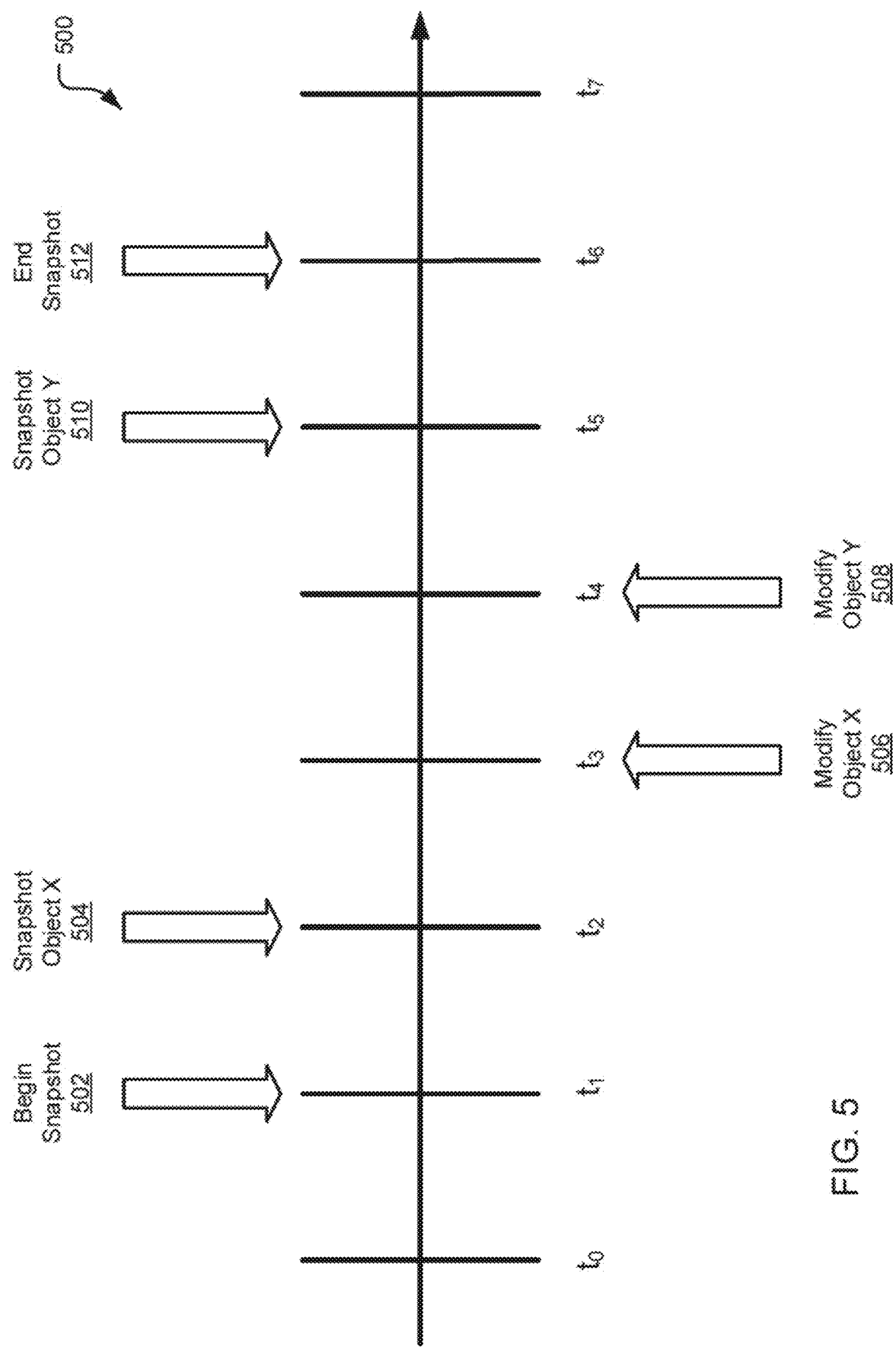
FIG. 5 illustrates a schematic diagram of a process flow for generating a database snapshot in accordance with the teachings and principles of the disclosure.

FIG. 5 is a schematic diagram illustrating a process flow 500 for generating a database snapshot. The database snapshot enables instantiating a copy of a source database in a different location, e.g. copying database data stored in a primary deployment into a secondary deployment. The snapshot captures one or more objects of the database, for example the structure of the database (e.g. schemas, tables, views, etc.) and/or the contents of the database (i.e. rows). In certain embodiments, the conceptually cleanest approach occurs where the snapshot reflects a transactionally consistent view of the database at a specific point in time. In an embodiment, a transactionally consistent point in time snapshot is not a strict requirement and it is sufficient to generate a snapshot that can be brought through the application of a set of transaction log records to a transactionally consistent state.

The process flow 500 illustrates a timeline depicting a snapshot that is initiated at time $t_1$ and completes at time $t_6$. The process flow 500 begins and a snapshot is initiated at 502. A snapshot of object X is generated at 504 at time $t_2$ and the snapshot of object Y is generated at 510 at time $t_5$. It should be appreciated that object X and object Y may represent any two objects in the database. As illustrated, object X is modified at 506 at time $t_3$ and object Y is modified at 508 at time $t_4$. Object X is modified at 506 after the snapshot of object X is generated at 504. Object Y is modified at 508 before the snapshot of object Y is generated at 510. The snapshot ends at 512.

Depending on semantics of how individual object snapshots are generated, the process flow 500 illustrated in FIG. 5 may or may not produce a transactionally consistent point in time representation of objects X and Y. If the snapshot representation of an object is generated based on the state of the object at the time the snapshot was initiated, the snapshot itself will be a transactionally consistent representation of the database at the point at which the snapshot began. For example, in the context of FIG. 5, the semantics would correspond to producing snapshot representations of both X and Y based on the state at time $t_1$ and would lead to a snapshot that provides a transactionally consistent view of both X and Y at point in time $t_1$. If, however, the snapshot representation of an object is generated based on the object at the time the snapshot representation of the object is generated, the snapshot will not necessarily be a transactionally consistent representation of the database at any point in time. For example, in the context of FIG. 5, the semantics would correspond to producing a snapshot representation of X based on its state at time $t_2$ and a snapshot representation of Y based on its state at time $t_5$. This combination would produce a snapshot that corresponds to a database state that never existed and is potentially invalid depending on the relationship, if any, between the two modifications at 506 and 508.

For example, a potentially anomalous state may occur where modification at time $t_3$ adds a column to table X and the modification at time $t_4$ creates table Y based on a CTAS involving the new column on table X. The CTAS essentially generates a new table object by performing a select query against the database. This select query could involve multiple tables in the database. In an example implementation, there may be a dependency between the data and structure of objects X and Y. In such an implementation, there may be a scenario where object X does not have a column even if object Y was created based on both the data and structure of object X. This scenario may create the possibility that structural changes and content changes may interact in subtle ways. Other scenarios may exist that lead to guaranteed inconsistencies. For example, if the modifications to X and Y are part of a single transaction, then producing a snapshot based on the current state would lead to a torn transaction where part of the transaction is reflected in the snapshot and another part of the transaction is not reflected in the snapshot.

In an embodiment, regardless of how the snapshot is generated, it is possible to bring the target to a transactionally consistent state at the end of the snapshot time by starting with the snapshot and then applying any log records generated during the snapshot timeframe in the serialized order of the log records. In such an embodiment, the previous statement assumes that applying a log record is an idempotent operation where the target database already reflects the update made by a particular log record and applying the log record is a no-op. In the context of such an example, applying the log records affiliated with the modifications at time $t_3$ and time $t_4$ to the generated snapshot will lead to an end state consistent as of time $t_6$ regardless of how the individual object snapshots were generated.

In an embodiment of database replication, the snapshot provides the initial state for the target database upon which all subsequent changes will be applied. In an embodiment, a snapshot is generated for database data stored in a primary deployment such that the database data may be copied in one or more secondary deployments. In a further embodiment, a snapshot is generated for a secondary deployment to capture any updates made to the database data stored in the secondary deployment while a primary deployment, or one or more other secondary deployments, were unavailable. If the snapshot is inconsistent with the source database, the target database will also be inconsistent with the source database. Applying further changes to the inconsistent starting point will, in general, not correct the inconsistency. For example, if a client account fails over from a source database (in an embodiment, the source database is the primary deployment) to a replica secondary deployment that has drifted from the source database (in this case, the primary deployment), the net effect is data corruption and/or data loss. Because a failover can take place at any time, ensuring transaction consistency between a source database (e.g. primary deployment) and a target database (e.g. secondary deployment) may be critical to the value proposition of database replication. In an embodiment, ensuring consistency of the database constructed from a snapshot is a building block for establishing and maintaining consistency between a source database and a target database at all times.

Generating a Database Snapshot

In an embodiment, the various pieces of information that comprise a database includes metadata files. An implementation of the metadata files may be referred to herein as Expression Property "EP" files. EP files may specifically include cumulative table metadata including information about all data that is stored throughout a table in the database. EP files may further include grouping expression properties that include information about the data stored in a grouping of micro-partitions within the table. EP files may further include micro-partition statistics that include information about data stored in a specific micro-partition of the table, such as minimum/maximum values, null count, number of entries, and so forth. EP files may further include column expression properties that include information about data stored in a particular column of a micro-partition of the table. The metadata files disclosed herein may specifically include EP files or may include any other file that includes information about database data.

Metadata files include information describing the structure of the database and may include the list and properties of any schemas in the database, the list and properties of tables and views in each schema, the list and properties of columns present in each table or view, and so forth. Individual table contents may be defined by a combination of EP files and any other form of metadata files. The individual tuple values of individual table contents may be stored in micro-partitions. In an embodiment, the precise set of micro-partitions that includes the contents of a particular table at a particular point in transactional time is included in the contents of a set of metadata files. In an embodiment, a metadata file can be considered to include a list of micro-partitions. Both micro-partitions and metadata files are immutable and may be stored and encrypted in storage. In an embodiment, the list of metadata files affiliated with a table at a particular point in transactional time is maintained in a metadata store that is separate from database data.

In an embodiment, the starting point for generating a snapshot of the database is the DatabaseDPO ("Database Data Persistence Object") stored in metadata. The DatabaseDPO is a data structure for interacting with persistent catalog information stored in metadata. The DatabaseDPO itself is effectively the root of a tree that includes all objects within the database, i.e. all objects needed for the snapshot. Each object in the tree rooted at the desired DatabaseDPO may be serialized into the snapshot. The serialized representation of an object may encapsulate everything necessary to recreate an exact copy of the object in the remote location (the target database).

For a table, there may be an additional question of how to serialize the table contents. In an embodiment, reading the entire table and serializing the contents may be require extensive computing resources and may lead to very large snapshot sizes. In such an embodiment, it may be enough to serialize the list of metadata files for the table. As such, when the snapshot is consumed at the target database, the metadata files can be copied to the target, read at the target to derive the list of micro-partitions with all tuples, and those micro-partitions can be copied to the target as well. Both metadata files and micro-partitions may be encrypted in the snapshot and may include information that will allow the target to obtain the appropriate keys to decrypt the files. The files at the target may need to be re-encrypted with new keys that are managed by the target. In an embodiment, the snapshot image of a table includes a metadata file list as a representative of the table contents. Further in an embodiment, the snapshot includes some piece of information to enable the target to obtain one or more keys for making a copy of the metadata files and the micro-partitions.

Generating Transaction Log Records

In an embodiment, a transaction log record ensures the log records themselves include enough information to correctly and unambiguously reproduce the transaction change on the target. This may be satisfied because changes applied by the transaction log are known at commit time and the method may include capturing and serializing the metadata changes made by the transaction. In an embodiment, the transaction log record is accessible to all target databases regardless of deployment, region, or underlying cloud provider. The transaction log record may be written to remote storage.

In an embodiment, a primary deployment becomes unavailable and all database operations are shifted to a secondary deployment. During the time when the primary deployment is unavailable, all updates to the database data may be executed on the secondary deployment. A transaction log record may be generated for all updates executed on the secondary deployment, and the transaction log record may be used to propagate those updates to the primary deployment when the primary deployment is no longer unavailable. In such an embodiment, the use of the transaction log record may ensure that only those new updates (made to the secondary deployment) are executed on the primary deployment, and that no stale data or previously ingested data is propagated to the primary deployment.

In an embodiment, in terms of when the transaction log record is generated, the systems, methods, and devices as disclosed herein are configured to ensure the write of the transaction log record is effectively part of the transaction itself. The transaction log record may only be written to remote storage if the transaction commits, and further the transaction only commits if the transaction log record is written to remote storage. A deviation from such a procedure may lead to a transactional inconsistency between the source database and the target database.

Figure 6:
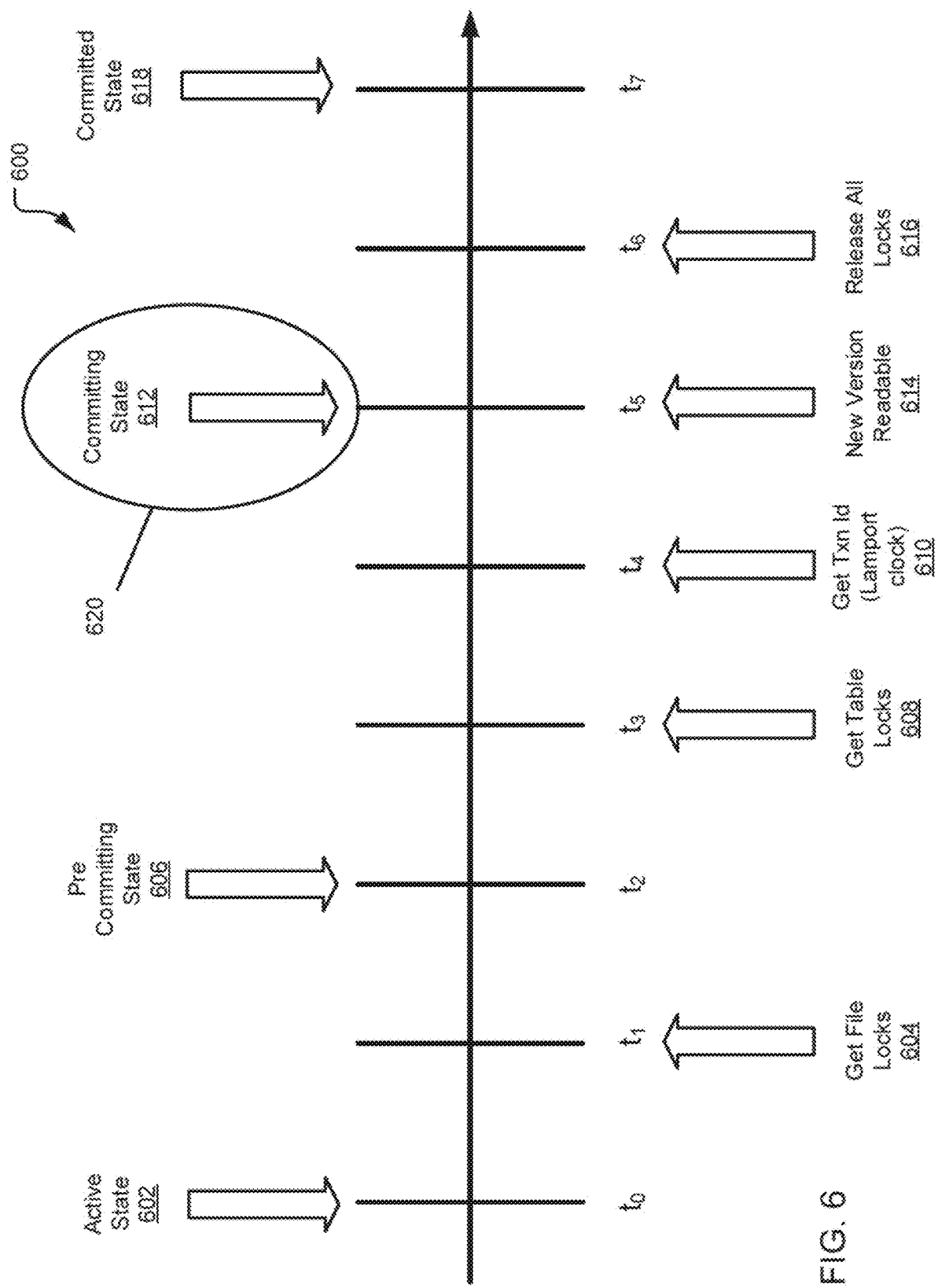
FIG. 6 illustrates a schematic diagram of a process flow for generating a transaction log for replicating a database in accordance with the teachings and principles of the disclosure.

FIG. 6 is a schematic diagram illustrating a process flow 600 for generating transaction logs for replicating a database. The process flow 600 illustrates a timeline proceeding from left to right. In FIG. 6, transactions occurring in the internal transaction state are illustrated above the timeline and actions taken to support concurrency control and transaction processing are illustrated below the timeline. At time $t_0$, the transaction is open and in the active state at 602, and at this point no Data Manipulation Language (DML) actions have been performed. At time $t_1$, processing of a DML statement is in-flight. During DML statement processing, the process flow 600 includes obtaining a file lock at 604 on the affected tables to support multiple concurrent DML operations targeting the same table. It should be appreciated that obtaining a file lock at 604 may occur any number of times and will occur multiple times in a multi-statement transaction. At time $t_2$, commit processing begins and the beginning of commit processing is recorded by transitioning to the pre-committing state at 606. At time $t_3$, the table locks are obtained at 608 on all tables modified in the transaction. After all table locks have been acquired at 608, an Account-level Lamport clock is utilized to generate a new and unique transaction identification at 610 at time $t_4$. In an embodiment, obtaining the transaction identification at 610 after acquiring all table locks at 608 ensures an unambiguous commit ordering (based on Lamport clock value) between any two potentially conflicting transactions. After obtaining a transaction identification at 610, the transaction is able to transition into the committing state at 612 at time $t_5$. In an embodiment, the transition to the committing state at 612 can represent a "point of no return" 620 for the transaction. Prior to this transition, the transaction commit itself could still be cancelled or aborted due to user action, processing error, system failure, etc. Once the transition to the committing state 612 has occurred, however, the transaction is effectively committed from the system perspective. At time $t_5$ the effects of the transaction are applied to the system and can no longer be rolled back. Note also that at time $t_5$ (below the timeline) the new table version is now readable at 614 by other concurrently running transactions. At time $t_6$, all locks held by the transaction are released at 616. Releasing locks enables any potentially conflicting transactions waiting on these locks (at 604 or 608) to acquire the locks needed to progress through the commit protocol. At time $t_7$, the transaction transitions to the committed state at 618 and has completed all processing. In an embodiment, any failures after time $t_5$ will not result in a rollback of the transaction. For example, if the node processing the transaction fails immediately after time $t_5$, for example, a new node will pick up processing where it was left off, release locks, and roll the transaction forward to completion.

In an embodiment, the transaction log record is written to remote storage at time $t_5$ at the transition into the committing state at 612. In certain embodiments it can be problematic to write the transaction log record to remote storage prior to time $t_5$ because it may still be possible for the process flow 600 to abort prior to time $t_5$. Further, writing the transaction log record as part of the post-commit processing after time $t_5$ may avoid errant transaction issues.

Figure 7:
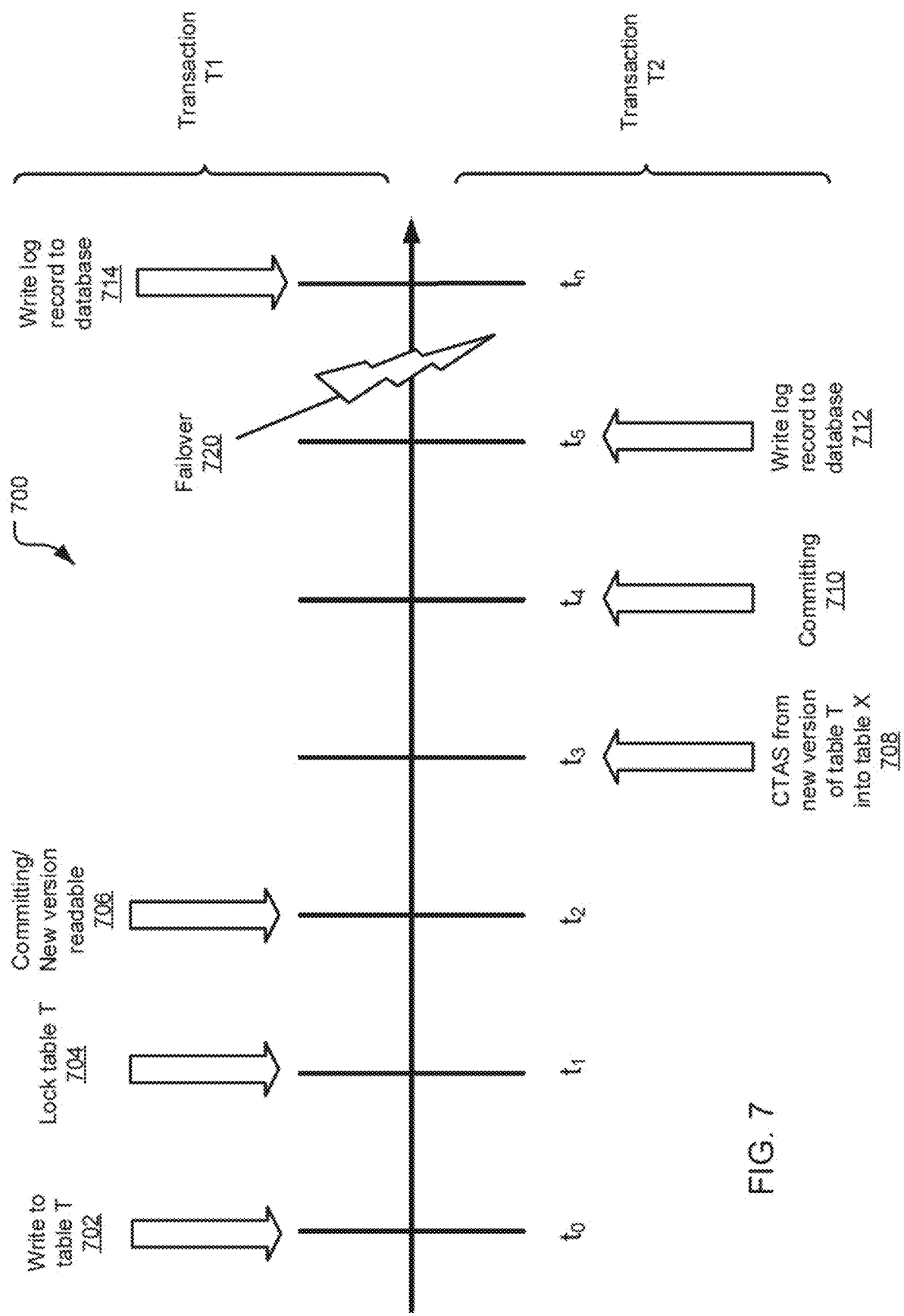
FIG. 7 illustrates a schematic diagram of a process flow for two different transaction for replicating a database in accordance with the teachings and principles of the disclosure.

In an embodiment, writing the transaction log record as part of the post-commit processing after time $t_5$ as illustrated in FIG. 6 may avoid the errant transaction problem but may open the possibility to a failure between time $t_5$ and the write of the transaction log to remote storage may lead to a transaction being committed on the source database but not on the target database. Because the write to remote storage may be part of the post-transaction processing, it may reasonably be assumed to occur at some point after the source is operational again and the transaction cleanup proceeds to completion. After it has occurred, the target may pick up the change and there may no longer by a missing transaction. However, a problem scenario may arise where there is a failover 720 as illustrated in FIG. 7. If there is a failover 720 from source to target that occurs in the window between the crossing of the point of no return 620 and the write to remote storage. In this case, a transaction may have committed on the source and would not be present on the target. In an embodiment, if the write to remote storage is positioned between time $t_5$ and time $t_6$ where all locks are released at 616, then all that is lost may be the last write to one or more tables and, furthermore, no explicit acknowledgment of the transaction commit of the affiliated write is ever sent back to an end user.

FIG. 7 is a schematic diagram illustrating a process flow 700 for two different transactions for replicating a database. The process flow 700 illustrates a case that may lead to a lost transaction in the presence of an ill-time failover 720. FIG. 7 illustrates where the interaction with metadata at time $t_5$ not only transitions the transaction to the committing state but also exposes the new version of any modified tables to the rest of the system in one atomic operation. As a result, the sequence of events as illustrated in the process flow 700 may be possible.

The process flow 700 in FIG. 7 illustrates a hypothetical timeline of two different transactions, transaction T1 and transaction T2. Actions taken by transaction T1 appear above the timeline and actions taken by transaction T2 appear below the timeline. At time $t_0$, transaction T1 performs a write against table T at 702. At time $t_1$, as part of pre-commit processing, transaction T1 obtains a lock for table T at 704. At time $t_2$, transaction T1 crosses the "point of no return" by atomically transitioning to the committing state and exposing the new version of table T with the write performed by transaction T1 to the rest of the system by committing the new readable version at 706. In the process flow 700 illustrated in FIG. 7, any various reasons may cause the writing of the transaction log record to remote storage to be delayed. As such, transaction T1 is remains in the post-commit processing and has not yet written the transaction log record to remote storage, has not yet released the lock on table T, and has not yet reported success back to an end user. At time $t_3$, transaction T2 reads the latest version of table T (including the write performed by Transaction T1) as part of a CTAS operation to create/populate table X at 708. At time $t_4$, this new transaction crosses the "point of no return" and is committed at 710. In certain implementations, such a transition is possible because transaction T2 does not need a lock on table T because it can only read from table T, and so it is not blocked by transaction T1 still holding a lock on table T. At time $t_5$, this new transaction writes its log record to remote storage at 712. The log record for transaction T1 still has not yet been written to remote storage. The process flow 700 further includes a failover 720 to a replica. In an embodiment as illustrated in FIG. 7, the replica is not transactionally consistent with any version of the source database. The replica includes the results of transaction T2 but does not include the results of transaction T1, despite that transaction T2 read the version of table T that was created by transaction T1. Transaction T1 has effectively been lost, and yet, transaction T2, which depends on transaction T1, was not lost. Thus, in the embodiment illustrated in FIG. 7, the database is inconsistent. Eventually the transaction log record for transaction T1 will be written to remote storage at 714, but, as illustrated in FIG. 7, a failover 720 may occur at any point in time including prior to the successful write to remote storage at 714 leading to a potential lost transaction.

The potential exposure to a lost-write or lost-transaction issue as illustrated in FIG. 7 may stem from the new version of a table being available to the rest of the system before the transaction log record is affiliated with the new version being written to the database. The lost-transaction embodiment illustrated in FIG. 7 may be avoided by not making a new version of the table visible to the rest of the system until after the write to remote storage occurs. Disclosed herein is an approach to defer exposure of the new table version until after the write to remote storage has occurred without disrupting the existing post-commit logic. The approach includes incorporating a prepare phase to the transaction as illustrated in FIG. 8.

Figure 8:
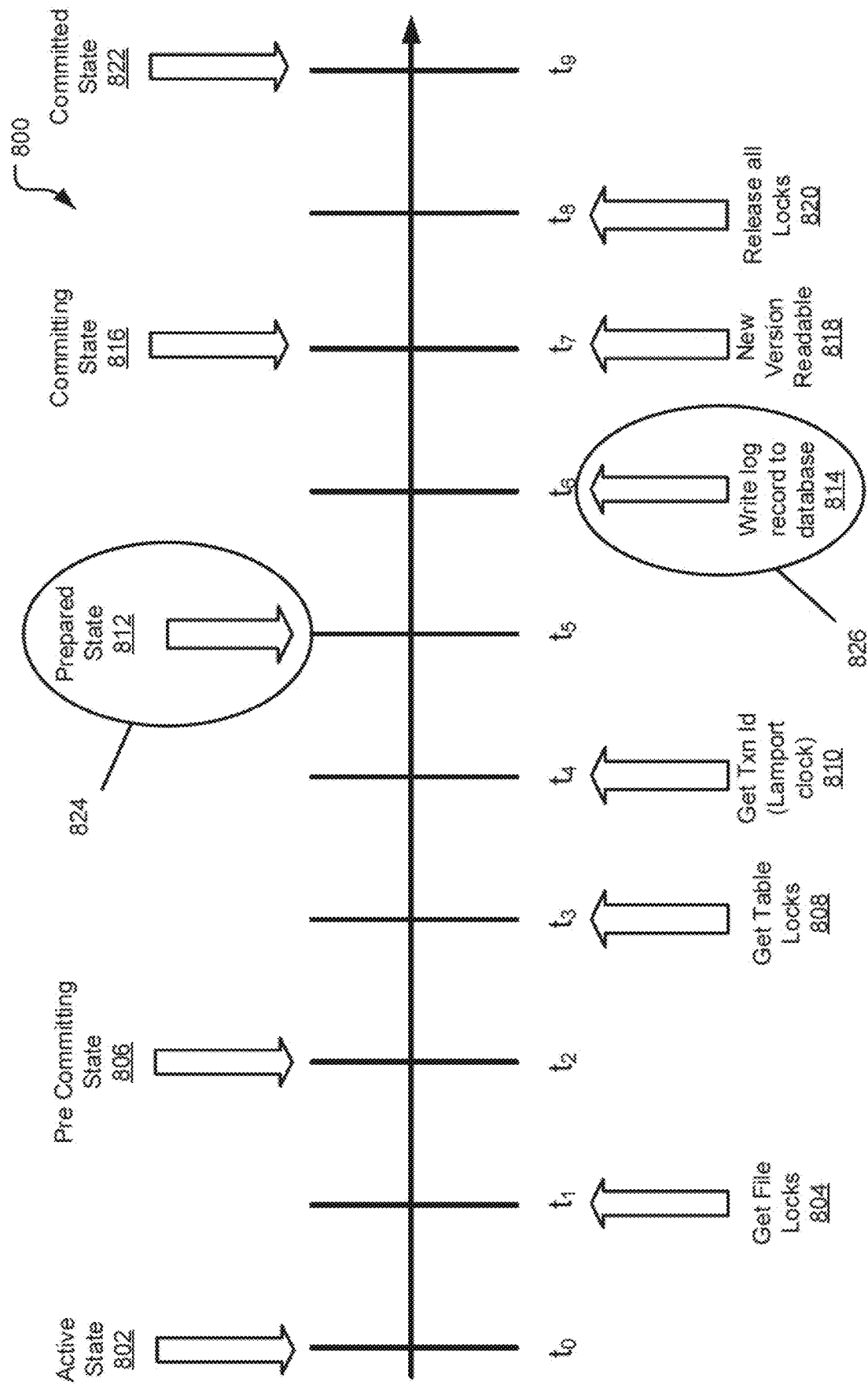
FIG. 8 illustrates a schematic diagram of a process flow including a preparation phase for replication of a database in accordance with the teachings and principles of the disclosure.

FIG. 8 is a schematic diagram illustrating a process flow 800 including a preparation phase for replication of a database. The prepare phase is introduced to defer exposure of the new table version until after the write to remote storage has occurred without disrupting the existing post-commit logic. The prepare phase may occur after acquisition of table locks and before transition to the committing state. In an embodiment, the purpose of the prepare phase is to transition the system into a state in which the transaction can be committed during cleanup or recovery, even in the event of a failure prior to the actual commit. The prepare phase writes the transaction log record to remote storage. Only after a confirmed successful write to remote storage would the transaction transition into the committing phase with the same semantics (e.g., making the new version of any modified objects readable by the rest of the system) from then onwards as in the protocols illustrated in FIGS. 6-7.

The process flow 800 includes an official commit point where the transaction log record is written to the database at 814 and this may be referred to as the "hard point of no return" 826. The process flow 800 further includes a prepared state at 812 at time $t_5$. The state transition to the prepared state at 812 may be referred to as a "soft point of no return" 824. At time $t_0$, the transaction is open and in the active state at 802, and at this point no DML actions have been performed. At time $t_1$, processing of a DML statement is in-flight. During DML statement processing, the process flow 800 includes obtaining a file lock at 804 on the affected tables to support multiple concurrent DML operations targeting the same table. At time $t_2$, commit processing begins and the beginning of commit processing is recorded by transitioning to the pre-committing state at 806. At time $t_3$, the table locks are obtained at 808 on all tables modified in the transaction. After all table locks have been acquired at 808, an Account-level Lamport clock is utilized to generate a new and unique transaction identification at 810 at time $t_4$. In an embodiment, obtaining the transaction identification at 810 after acquiring all table locks at 808 ensures an unambiguous commit ordering (based on Lamport clock value) between any two potentially conflicting transactions. At time $t_5$ the transaction enters the prepared state at 812 which can be considered a soft point of no return 824. The transaction then writes the transaction log record to a database at 814 which can be considered a hard point of no return 826. At time $t_7$, the committing state is entered at 816 and a new version is readable at 818. At time $t_8$, all locks are released at 820. At time $t_9$, the transaction enters the committed state at 822.

The transition to the prepared state at 812 may be referred to as a soft point of no return 824 due to the delayed write of the transaction log record to the database as discussed with respect to FIG. 7. Briefly, it is possible for a write to the database to timeout or terminate but then include the entry that was written to appear later. The original write may effectively overwrite the version of the entry produced by the rewrite. There may be a non-trivial delay between when a write request to the database terminates inconclusively and when that write actually appears on the database. Thus, there is a window of time after the inconclusive termination of a write request, but before the point at which the write appears in the database, during which a check in the database to determine if an entry exists or not may return a "false negative"—i.e., the check does not see the entry, so it assumes the write has not and will not happen, but in reality, the write has happened or will happen and the entry is not yet visible. If the check indicates the entry is not present, it is not safe to assume the record was not written and roll back the transaction—if the entry were to appear after the check, then the transaction would not have been applied at the source but would potentially be applied at the target(s) and this may generate inconsistency. Thus, in the event of a failure while the transaction is in the prepared state, a safe course of action may be to roll the transaction forward to completion by ensuring the transaction log record is rewritten to the database, transitioning to the committing state, and performing the post commit actions to complete the transaction. Thus, the transition to the prepared state at 812 may be characterized as a soft point of return 824 because transaction has not actually committed, but the only available terminal state for the transaction is a successful commit.

In an embodiment where a failover occurs, the semantics of the process flow 800 may be modified. If a failover occurs when a transaction is in the active state at 802 or the pre-committing state at 806, the results of the transaction will not appear in the target because the transaction log record has not yet been written to the database at 814 so it cannot be picked up by the target. If a failover occurs when a transaction is in the committing state at 816 or the committed state at 822, the results of the transaction will appear in the target because the transaction log record has already been written to the database at 814 as of the time of the failover so it will be picked up by the target.

If a failover occurs when a transaction is in the prepared state at 812, the results of the transaction may or may not appear in the target depending on whether the transaction log record was written to the database as of the time of the failover. Furthermore, if the target does pick up the transaction because the transaction log record was visible in the database at the time of the failover, it may be applied at the target because the source would have rolled forward to completion and the associated client account was not yet informed of the success or failure. Furthermore, if the target does not pick up the transaction because the transaction log records were not visible in the database at the time of the failover, an inconsistency may be avoided because the source did not expose the results of the write and would not have reported success back to the associated client account.

According to the process flow 800 illustrated in FIG. 8, certain relationships may be held as discussed herein. If two transactions have a conflicting write, the transaction identification for the first committed write may be lower than the transaction identification for the second committed write. This ordering is such that the writes synchronize on a table lock and the transaction identification is obtained at time 810 after the lock is obtained at 808 and before the lock is released at 814. Furthermore, if two transactions have a conflicting write, the transaction log record for the first committed write may appear before the transaction log record for the second committed write. This ordering may be guaranteed because the transaction identification ordering is guaranteed because the transaction log record write happens while the transaction holds the table lock. Furthermore, if one transaction (the reader) reads a table version produced by another transaction (the writer), the transaction log record for the writer may appear before the new table version was read by the reader. This order may be guaranteed because the write to the database at 814 occurs before the new table version becomes readable at 818.

In an embodiment, it is possible to guarantee the commit order of conflicting writes will be the same for both the source and target databases. The logic for applying transaction log records to the target must enforce the appropriate ordering, but this may be possible because the appearance of transaction log records in the database (with respect to conflicts) is guaranteed to be the same as the order in which the conflicts were resolved at the source. In an embodiment it may be up to the replication infrastructure to ensure the appropriate ordering of transaction log record application is enforced.

In an embodiment it is possible for two unrelated transaction to appear in a different order in the database than their transaction identification order in the source. A transaction with identification abc, for example, could have its log record appear in the database prior to that for the transaction with identification xyz, provided the two transactions have no conflicts with each other and no dependencies on each other. This could happen, for example, if the transaction with ID abc enters the prepared state at 812 and then stalls, after which the transaction with identification xyz enters the prepared state at 812 and successfully records its log record to the database. In general, this does not pose a transactional consistency issue because the order between two unrelated transactions is undefined. If, for some reason, it becomes a requirement to ensure that transaction log records appear in the database in transaction identification order, the transaction logging logic may be augmented to enforce this ordering via, e.g., introducing a transaction log lock and/or stalling writes until all prepared transactions with a lower transaction identification have flushed to the database.

In an embodiment, when generating a snapshot of the contents of a table (e.g. the metadata file list and implied micro-partition list), the common-time semantics may be achieved by extracting the table version that corresponds to the beginning snapshot time. Such an embodiment may be made possible because all DMLs are synchronized via appropriate locks, all DMLs are ordered via the internal Lamport clock, and all past versions are retained up to the time travel limit.

Figure 9:
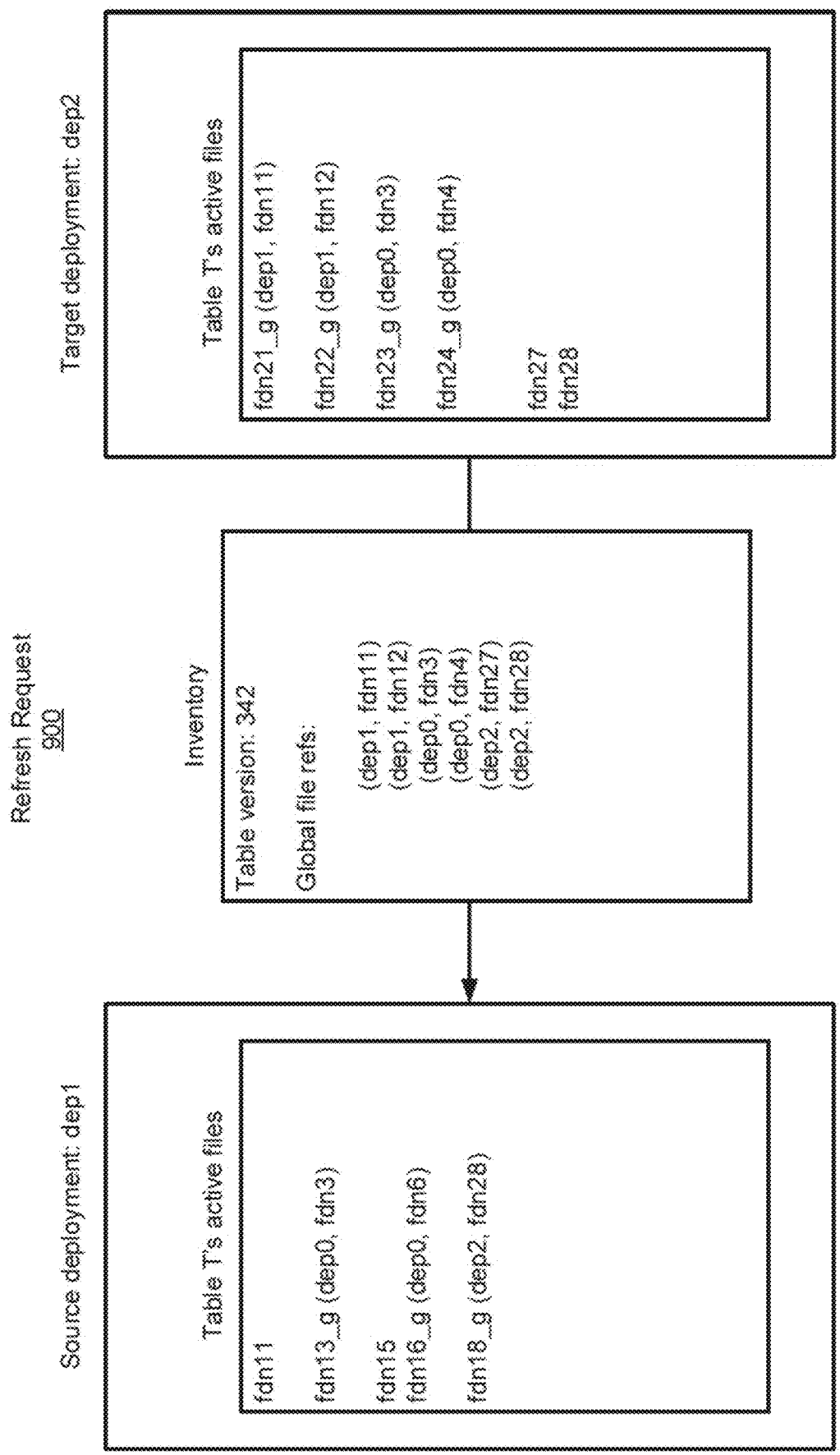
FIG. 9 illustrates the generation and transmission of a refresh request in accordance with the teachings and principles of the disclosure.

FIG. 9 is a schematic diagram illustrating a refresh request 900 for replicating a database. In an embodiment, synchronizing the state of a table of the target deployment to the table's state of the source deployment involves (a) sending a refresh request from the target deployment to the source deployment; (b) sending a snapshot response from the source deployment to the target deployment; and (c) importing the snapshot response into the target deployment. The refresh request 900 illustrated in FIG. 9 computes an inventory of active micro-partitions of the table at the target deployment. The inventory includes the current table version and the set of global micro-partition references active at the table version. In an embodiment as illustrated in FIG. 9, no other metadata or local file micro-partition short names are sent.

FIG. 9 illustrates sending a refresh request from a target deployment dep2 to a source deployment dep1. The source deployment dep1 includes a listing of table T's active files. The target deployment d2 also includes a listing of table T's active files. As depicted in the inventory box, the current table version is No. 342 by way of illustration. The inventory includes a listing of relevant global file references. The target deployment d2 converts all active files at table version No. 342 into a list of global file references according to the inventory. The locally added micro-partitions fdn27 and fdn28 are converted into global file references (dep2, fdn27) and (dep2, fdn28), respectively. As used herein, the naming convention "fdn" followed by a number may refer to a certain micro-partition in a table of the database. As illustrated in FIG. 9, only global file references are sent as part of the table's inventory, and only active files are sent.

Figure 10:
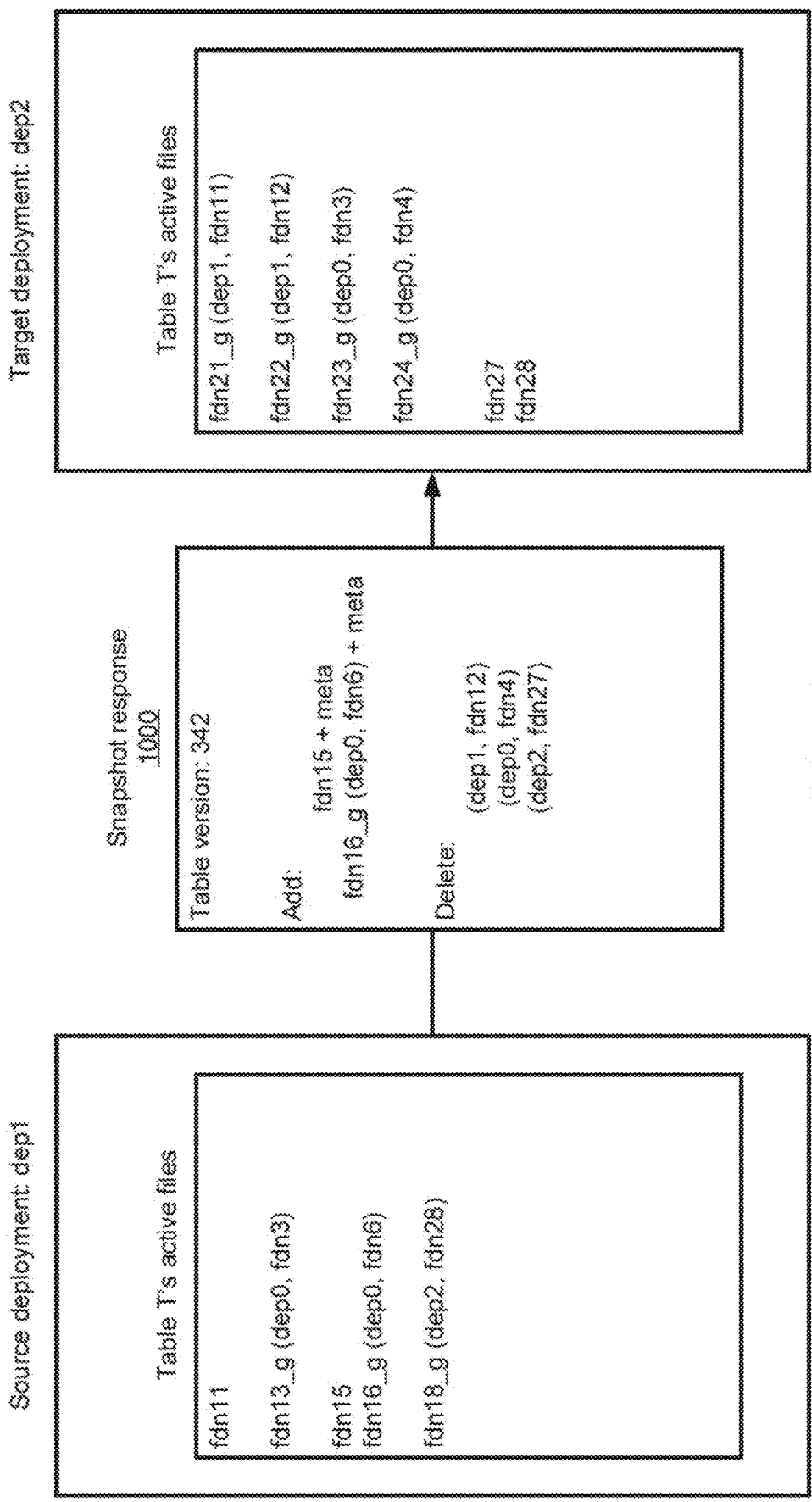
FIG. 10 illustrates the generation and transmission of a snapshot response in accordance with the teachings and principles of the disclosure.

FIG. 10 is a schematic diagram illustrating a snapshot response 1000 for replicating a database. The snapshot response 1000 is generated by the source deployment dep1 in response to the refresh request 900. The snapshot response 1000 includes one or more of: (a) all micro-partition metadata to be added to the table; (b) the actual micro-partitions in a re-encrypted state; (c) all global micro-partition references to be removed from the table; (d) the table version sent from the target deployment dep2; and (e) the replication master key from which the micro-partitions were re-encrypted. In an embodiment, the snapshot response 1000 is partitioned into the snapshot response message, metadata files, and micro-partitions. The snapshot response 1000 message may include pointers to metadata files. The metadata files may include the added micro-partition metadata and deleted global file references. The metadata files and micro-partitions may be copied to the target deployment d2's inbound volume.

FIG. 10 illustrates the source deployment dep1 transmitting the snapshot response 1000 to the target deployment dep2. Each of the source deployment dep1 and the target deployment dep2 include a listing of table T's active files. The snapshot response 1000 depicts table version No. 342 for illustration purposes and indicates the files and metadata to be added and deleted. In the embodiment illustrated in FIG. 10, the snapshot response 1000 indicates that (fdn15 and its associated metadata) should be added along with (fdn16_g (dep0, fdn6) and its associated metadata). The snapshot response 1000 indicates that (dep1, fdn12) and (dep0, fdn4) and (dep2, fdn2) should be deleted.

FIG. 10 illustrates that the target deployment dep2's table version No. 342 is sent back to the target deployment dep2. As illustrated in the discrepancy between the source deployment dep1 and the target deployment dep2, and as depicted in the snapshot response 1000, the micro-partitions with short names fdn15 and fdn16_g need to be added to table T at the target deployment dep2. Further, micro-partitions with global file references (dep1, fdn12), (dep0, fdn4), and (dep2, fdn27) need to be removed from table T. Micro-partitions fdn15 and fdn16_g will be re-encrypted and uploaded to the target deployment dep2's inbound volume. The replication master key is part of the snapshot response (not illustrated in FIG. 10).

FIG. 11 is a schematic diagram illustrating the importation 1100 of a snapshot response for replicating a database. In an embodiment, when importing a snapshot response, the table at the target deployment dep2 will be rolled back to the sent table version if necessary. The added files of the snapshot response may receive a local short name based on the DML's job ID and may include a postfix or other suitable identifier (the postfix "_g" is depicted in FIGS. 9-11). The original global file references may be stored as part of metadata. Global file references that need to be deleted may be converted into local short names at the target deployment dep2 using an in-memory index. In an embodiment, local short names are added to the metadata files that pertain to the DML command as part of the deleted short names section.

The importation 1100 of the snapshot response as illustrated in FIG. 11 illustrates that table T is rolled back to table version No. 342 if necessary. As illustrated in the embodiment in FIG. 11, the added files are added to the table using a local short name appended with "g", for example fdn25_g and fdn26_g. The original global file references are preserved, including (dep1, fdn15) and (dep0, fdn6). Additionally, the deleted global file references are converted into local short names, including (dep1, fdn12), (dep0, fdn4), and (dep2, fdn27), which are converted to fdn22_g, fdn24_g, and fdn27. Additionally, as illustrated in FIG. 11, the local deleted short names are added to a deleted section of the metadata files pertaining to the DML command. The table may be pruned by a compactor and both tables may contain the same state.

Figure 12:
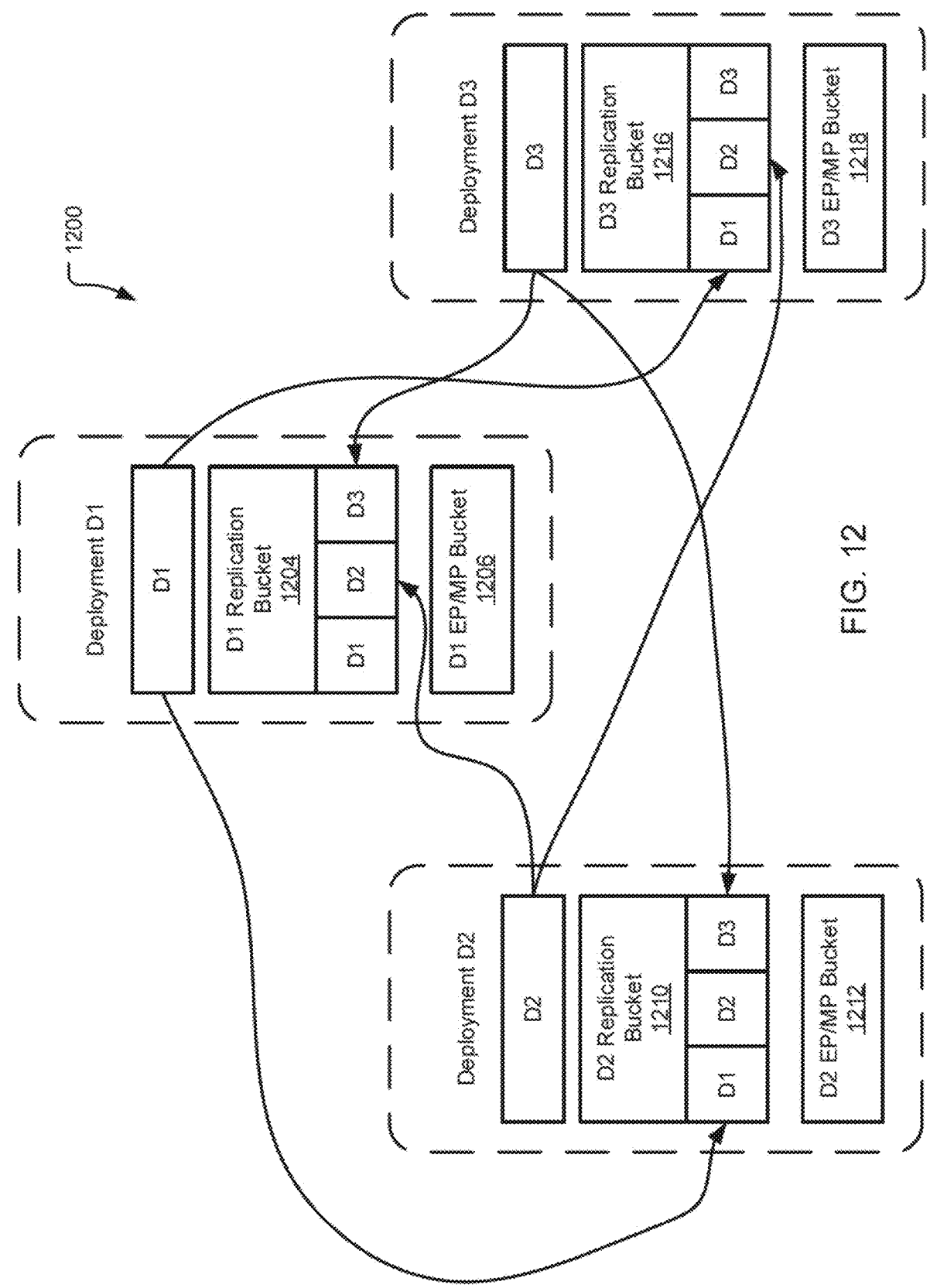
FIG. 12 illustrates a schematic diagram of a deployment architecture in accordance with the teachings and principles of the disclosure.

FIG. 12 is a schematic diagram illustrating a deployment architecture 1200 for replicating a database. The deployment architecture 1200 includes a deployment D1, deployment D2, and a deployment D3. The deployment D1 includes a D1 replication bucket 1204 where it receives messages from other deployments. Similarly, the deployment D2 includes a D2 replication bucket 1210 and the deployment D3 includes a D3 replication bucket 1216. Each of the replication buckets 1204, 1210, 1216 is split into sub-buckets, including one sub-bucket per deployment. Each of the sub-buckets of the replication buckets 1204, 1210, 1216 may be configured independently with permissions and access credentials. Deployment D1 includes a D1 EP/micro-partition bucket 1206, deployment D2 includes a D2 EP/micro-partition bucket 121, and deployment D3 includes a D2 EP/micro-partition bucket 1218.

In an embodiment, all stages for replication are created under a dedicated database such that the database may be referred to by a short name when creating deployments, and the deployments may be logically grouped. In an embodiment, DeploymentDPO is utilized to store deployment information that will be used by a messaging service and other parts of the infrastructure. The DeploymentDPO is a regular dictionary entity in an embodiment, and access to it via create, show, and drop statements are restricted. The DeploymentDPO is a data structure that includes information (i.e. metadata) about a particular deployment. The DeploymentDPO may be used for operations involving that particular deployment.

Each of the replication buckets 1204, 1210, 1216 may have server-side encryption activated. Additionally, all files including customer data may be encrypted on the client side. A deployment may have full access to its own replication bucket and a deployment have may have write access only to its sub-bucket on another deployment's replication bucket where it writes messages to.

In an embodiment, when a new deployment is generated, a new replication bucket for that deployment is generated, including all sub-buckets for all deployments, such that other deployments may send messages to the new deployment. Additionally, a new sub-bucket for the deployment may be added to the replication buckets of all other deployments such that the new deployment may send messages to the existing deployments.

The messaging infrastructure as illustrated in FIG. 12 provides an infrastructure that enables deployments to exchange generic messages by exchanging files on buckets. The messages may be exchanged via cloud storage and may be transparent to an associated client account. For an associated client account, it may appear the account is only interacting with a regular Data Persistence Object (DPO) on the local metadata. A message service layer may encapsulate how the messageDPOs are serialized and exchanged.

Figure 13:
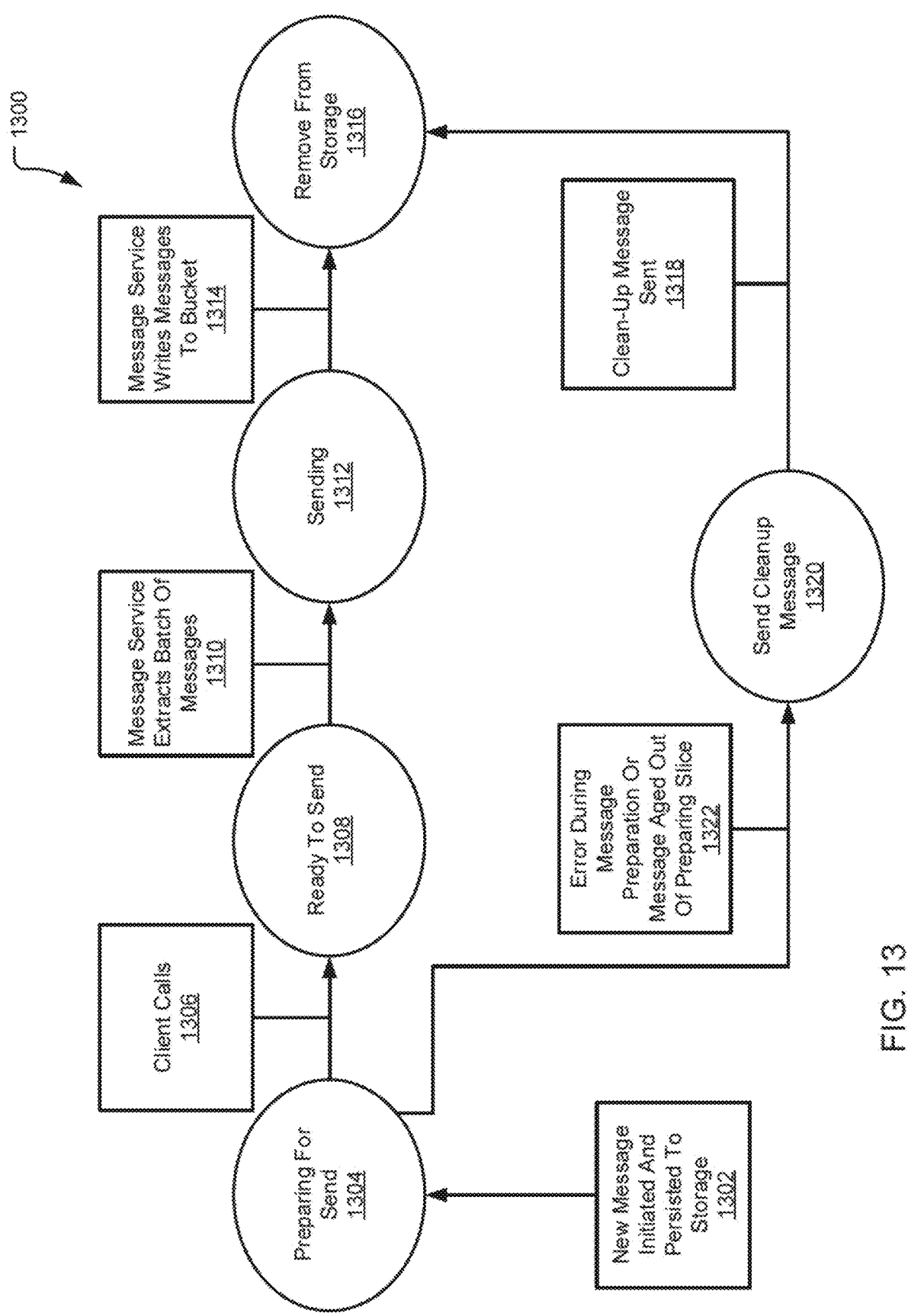
FIG. 13 illustrates a schematic diagram of a process flow for sending messages in accordance with the teachings and principles of the disclosure.

FIG. 13 is a schematic diagram illustrating a process flow 1300 for sending messages when replicating a database. The process flow 1300 begins and a new message is initiated and persisted to storage at 1302. The message is preparing for send at 1304 and a client account calls at 1306 indicating the message should be sent. After all files are uploaded, the message is ready to send at 1308 and a message service extracts a batch of messages at 1310. The message service periodically extracts a batch of messages that are ready to send and moves them to the sending slice at 1312, and a message service writes the messages to a bucket at 1314. After the message file has been generated and the message has been sent, the message will be cleaned by the receiving side and removed from storage at 1316. If an error occurs during preparing or the message is aged out of preparing slice at 1322, the uploaded files are cleaned from cloud storage at 1320. After the cleanup message is sent at 1318 to the receiving deployment, the message can be removed from storage. The message service periodically extracts a batch of messages that are ready to send and moves them to the sending slice at 1312. In an embodiment, the message sending service calculates and caches the derived key that is utilized to wrap the data encryption key. The message service may further need to persist the current and next diversifier and the current and next message filename in storage.

Figure 14:
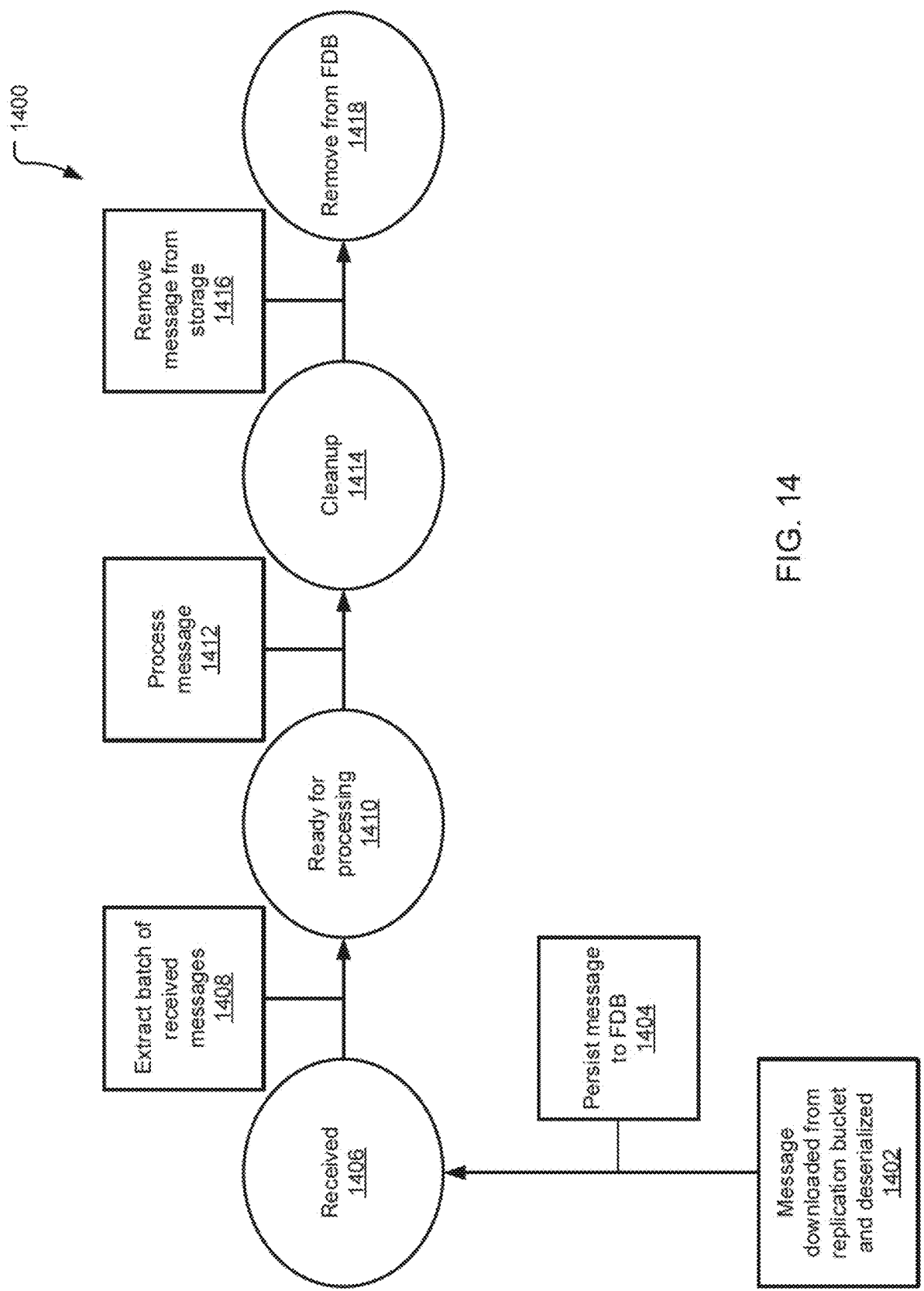
FIG. 14 illustrates a schematic diagram of a process flow for receiving message in accordance with the teachings and principles of the disclosure.

FIG. 14 is a schematic diagram illustrating a process flow 1400 for receiving messages when replicating a database. The process flow 1400 includes a message service downloaded a message filed from a replication bucket and de-serializing the message file at 1402. The message is deserialized and persisted to storage at 1404. The message is received at 1406 and a batch of received messages is extracted at 1408. The message processing service forms a batch of received messages and moves them to a ready for processing slice at 1410. After a worker thread processes the message at 1412, the message is ready for cleanup at 1414. A cleaner removes the message files from cloud storage at 1416 and the message can then be removed from metadata at 1418.

In an embodiment, cleanup of the message occurs on the receiving side because the sender only has write access to the replication buckets. After a message has been processed, the cleanup service may purge all related files on cloud storage and remove the message from storage. In an embodiment, for all messages that have errored out during preparation, a clean-up request is sent to the receiving deployment.

Figure 15:
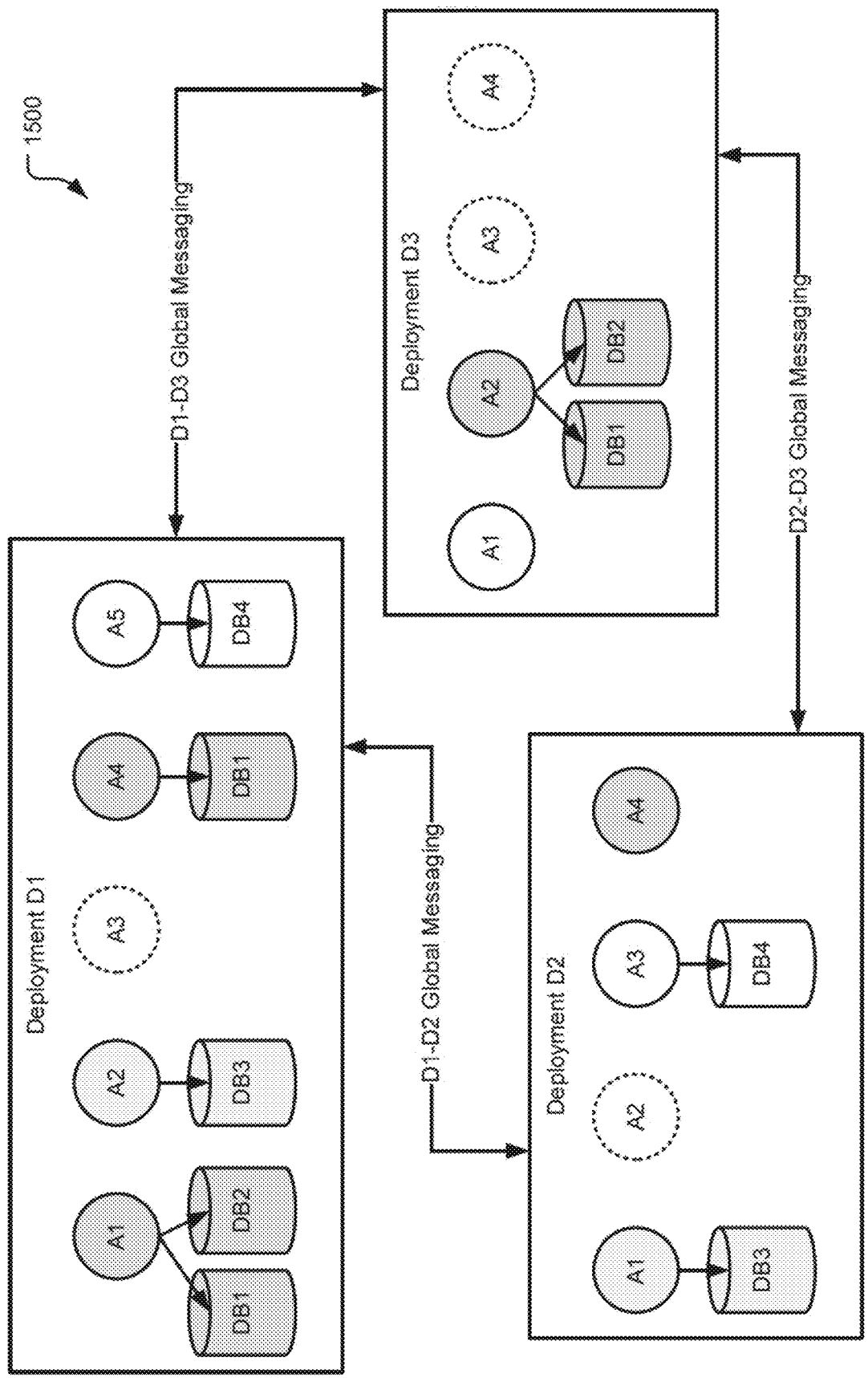
FIG. 15 illustrates a schematic diagram of a global deployment group in accordance with the teachings and principles of the disclosure.

FIG. 15 is a schematic diagram illustrating a global deployment group 1500 including three deployments for replicating a database. During database replication as disclosed herein, metadata is persisted and exchanged within deployment replication groups (may be referred to as a deployment group). Deployment groups are generated to enable replication between each of the deployment groups. In an embodiment, each deployment maintains a list of all other deployments in the group, including itself. In an embodiment, the list is maintained manually within each deployment using a "create deployment" Data Definition Language (DDL) which will be used to add new deployments in the group. This DDL may be executed on every existing deployment. Within a deployment, an account may be made global (versus local) to form a new account replication group or to join an existing account replication group. Only accounts which are part of the same account replication group may replicate data among the group. In an embodiment, forming a new account replication group is initially performed in response to a client account request to link two or more of the client's accounts together. The new accounts may be automatically placed in the same replication group as the account from which the create statement was issued.

In an embodiment, accounts within a single account group may promote local objects to be global or may directly create global objects. In various embodiments, an object may include a database, a user, a role, a warehouse, a global connection, an organization, and so forth. Once an object is global, it may be replicated within any account in the global account group. Replicating a global object is achieved by first creating a local replica object for that global object on all accounts where the object is to be replicated and then by refreshing these replicas explicitly, on schedule, or continuously. In an embodiment, only databases may be made global by an account administrator, and replicas may only be refreshed explicitly by the owner of the database.

In an embodiment, there exist three classes of metadata to manage and replicate database data. One class of metadata is directed to deployments, including metadata about each deployment of a deployment group that is created and replicated manually by replication. One class of metadata is directed to global accounts, wherein all global accounts of a deployment may be replication to all other deployments within the deployment group it belongs to. One class of metadata include global databases, including all global databases on an account that may also be replicated within the same account group. In an embodiment, only information about all replicas of a global database are replication in the account group to the subset of deployments where the account group exists.

FIG. 15 illustrates an example using global deployment group including three deployments, deployment D1, deployment D2, and deployment D3. As illustrated in FIG. 15, deployment D1 includes five accounts, including D1.A1, D1.A2, D1.A3, D1.A4, and D1.A5. Deployment D2 includes four accounts, including D2.A1, D2.A2, D2.A3, and D2.A4. Deployment D3 includes four accounts, including D3.A1, D3.A2, D3.A3, and D3.A4. In the embodiment illustrated in FIG. 15, there exist four local accounts that are not part of any group and cannot have global objects. The four local accounts include D1.A3, D2.A2, D3.A3, and D3.A4 and are illustrated with a dotted line. Only global accounts (i.e. the accounts illustrated with a solid line and shaded with no fill, light grey fill, or dark grey fill) may create or replicate global databases. In the example illustrated in FIG. 15, there exists four global databases, including DB1, DB2, DB3, and DB4. The same global database may only exist or be replicated within the same account group. In the example illustrated in FIG. 15, DB1 and DB2 are global databases that may only be replicated within the account group including D1.A1, D1.A4, D2.A4, and D3.A2. Further, DB3 may only be replicated within the account group including D1.A2 and D2.A1. Further, DB4 may only be replicated within the account group including D1.A5 and D2.A3. Additionally, as illustrated in FIG. 15, global databases are not necessarily replicated by all accounts within a global account group. For example, a client owner of the dark shaded account group (associated with DB1 and DB2) did not replicate DB2 with the D1.A4 account.

In an embodiment, metadata about all replicas of a global object is replicated to all accounts in the account group. In certain embodiments this may permit a local account (i.e. those illustrated with a dotted line) administrator to list all replicas, local or remote, of any global object in the group. This may enable a client account administrator to generate new replicas of a global object in other accounts in the account group (e.g. the account group illustrated with no fill, light grey fill, or dark grey fill), by specifying that the new object being created is a replica of that global object.

As an example, the client account for account D2.A4 (associated with the dark grey fill account group) wishes to replicate global database DB2 to that account. In that account, the client account may execute a command to show global databases. The command will list replicas of all global databases in the account group. Based on this example, the command will show five examples as illustrated in Table 1, below.

TABLE 1

| Region | Account | Replication Group | Name |
| --- | --- | --- | --- |
| D1 | A1 | b4a193a3-77cc-49dc-a9c8-2a2ee1ae9b1e | DB1 |
| D1 | A4 | b4a193a3-77cc-49dc-a9c8-2a2ee1ae9b1e | DB1 |
| D3 | A2 | b4a193a3-77cc-49dc-a9c8-2a2ee1ae9b1e | DB1 |
| D1 | A1 | 0400d847-4199-4f79-9a74-381761bc0cc9 | DB2 |
| D3 | A2 | 0400d847-4199-4f79-9a74-381761bc0cc9 | DB2 |

As illustrated in Table 1, the "replication group" column depicts the same values for all replicas of the same database. The database replicase are linked together like an account in the account group. These databases further form a replication group with an identification number equal to the replication group number. Further to the aforementioned example, the client account of D2.A4 may create a new replica in the database replication group named "0400d847-4199-4f79-9a74-381761bc0cc9" by issuing a command to do so. It should be appreciated that the local name of the replica may be anything and specifying the replication group identification number makes the database part of the same replication group as the other databases that were in that group. After generating a new database replica, the client account for D2.A4 may then issue a command to show all database replicas and will then receive a list with the replica that was just generated, as in Table 2 illustrated below.

TABLE 2

| Region | Account | Replication Group | Name |
| --- | --- | --- | --- |
| D1 | A1 | b4a193a3-77cc-49dc-a9c8-2a2ee1ae9b1e | DB1 |
| D1 | A4 | b4a193a3-77cc-49dc-a9c8-2a2ee1ae9b1e | DB1 |
| D3 | A2 | b4a193a3-77cc-49dc-a9c8-2a2ee1ae9b1e | DB1 |
| D1 | A1 | 0400d847-4199-4f79-9a74-381761bc0cc9 | DB2 |
| D3 | A2 | 0400d847-4199-4f79-9a74-381761bc0cc9 | DB2 |
| D2 | A4 | 0400d847-4199-4f79-9a74-381761bc0cc9 | DB5 |

Further to the aforementioned example, the same command issued from any account in that group (i.e. D1.A1 or D1.A4) will generate exactly the same list. Propagation of replicated metadata may take a period of time, for example it may take several seconds, and after that period of time every other deployment will know about the new replica.

Similar to the "show global databases" command, a "show global accounts" command may be issues to generate a list of the set of accounts in the group. Continuing with the aforementioned example, if the client account for D3.A2 issues the "show global accounts" command, it will return a list as in Table 3, below.

TABLE 3

| Region | Account |
| --- | --- |
| D1 | A1 |
| D1 | A4 |
| D2 | A4 |
| D3 | A2 |

As illustrated in Table 3, the account replication group identification number is not exposed because there is only one account replication group for a given customer. When running the same command from any client account the in the deployment group, the command will generate a list showing all account groups, and in that case one column may be added that shows the replication group identification number.

Storing Metadata about Global Entities

Each deployment in a deployment group may maintain metadata about all global accounts in the group. Again, using the aforementioned example, each deployment may maintain the list of all global accounts, i.e. D1.A1, D1.A2, D1.A4, D1.A5, D2.A1, D2.A2, D3.A1 and D3.A3. The list of all global accounts may be fully replicated. In addition, each deployment will maintain metadata about all global objects in the subset of account groups that exist in that deployment. Still using the example, deployment D1 maintains metadata about all global objects owned by the no-fill, light grey, and dark grey sub groups. Because deployment D2 only hosts accounts from the dark grey and no-fill account group, it will only need to maintain metadata about databases belonging to those two account groups. Further, deployment D3 must only maintain information about global databases in the light grey and no-fill account groups.

In each deployment, a single DPO may be utilized and may be named the GlobalEntitiesDPO. The GlobalEntitesDPO is a data structure that maintains information and/or metadata about entities that are replicated, such as accounts, databases, organizations, and/or connection. The single DPO may store metadata about all global object replicas including global accounts. The accounts may be modeled in an account group as replicas of the same global account. Thus, information about global accounts and to-level account entities, such as databases, users, roles, and warehouses, is unified. Further, with each deployment, the GlobalEntitiesDPO may store information about any global entity replica the deployment needs to know, i.e. information on all global account and database replicas the deployment needs to know about (for example, any replicas in any account group that exist on the deployment).

In addition to GlobalEntitiesDPO, whose content is replicated between deployments, a deployment may identify all entities that are global in the deployment. For this, a new DPO is not needed but may enhance the existing BaseDictionaryDPO. The BaseDictionaryDPO is an underlying abstraction for DPO data structures that may be used to manage information that is accessible in a catalog. A field may be added for the global identification number which, if not null, will indicate the dictionary entity is global. Further, all global dictionary entities may be indexed by adding a new object named "global" to find any global entity given the global identification number. In an embodiment this may simplify the process of finding all global entities of a certain type in a particular deployment or in a particular account.

In an embodiment, generating a global database includes creating the first master replica in a global database replication group. When this first master replica is created, a global database replication group may be automatically created for it. Other replicas in the group may be created using a "replication group" command.

In an embodiment, a global object may be converted back into a local object. A command to alter the account may be provided to a client or administrator account to transition an existing global account into a local account. As a side effect of this command, all global objects within the account may be made local. Further, a single global database may be made back into a regular local database using a similar command.

In an embodiment, any change made to a replica will be replicated to all other deployments interested in the change. A change may include a create, drop, update, or other adjustment. Replication of the change will occur as soon as possible and may occur in less than five seconds. Further, a replication will be made of all replicas created in the deployment at a regular time period, for example once per hour, even if nothing has changed. This may ensure that if anything fails, there will still be some coverage.

Additionally, replication of replica metadata may occur in the background. The metadata for a replica may be changed by a client account or administrator owning the replica, and the transaction making the change may also utilize the notification to notify that a change was made. In an embodiment, the notification payload is only the domain consuming the changes. As soon as a change is made, the thread will replicate the change to all relevant deployments. For an account change, this may be all deployments in the deployment group, and for a database change they may only be a subset of deployments where the account is replication.

In an embodiment, replicating a change utilizes the global messaging framework. The change may be pushed using one global message per deployment. The same information may be replicated more than once so the change notification may be removed from storage only when all global messages for that change have been queued.

Figure 16:
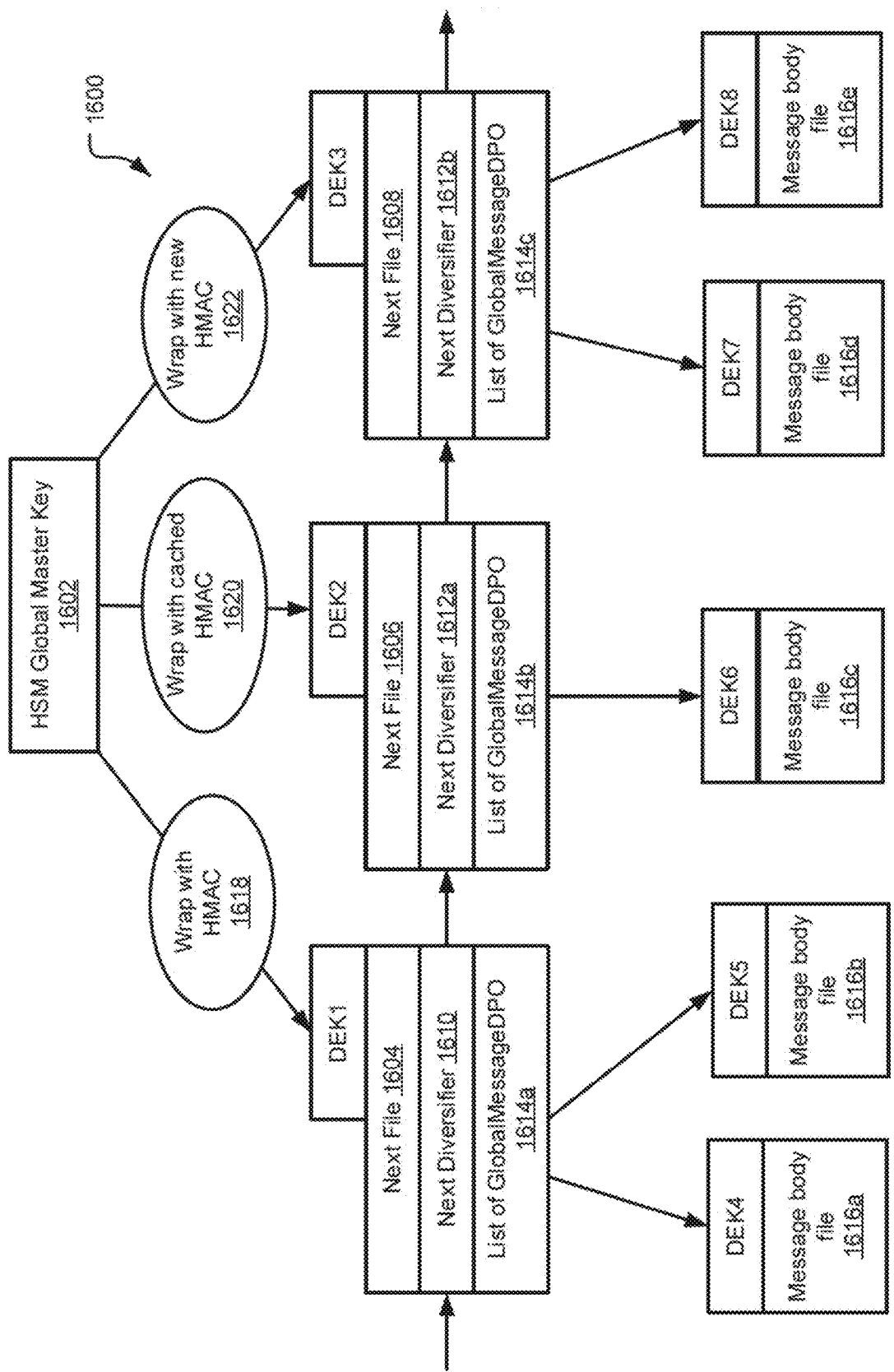
FIG. 16 illustrates a schematic diagram of an encryption system in accordance with the teachings and principles of the disclosure.

FIG. 16 is a schematic diagram illustrating an encryption system 1600 for replicating a database. In an embodiment, encryption is carried out by encrypting each file with a different key and limiting the number of accesses to the HSM (Hardware Security Module). Additionally, the encryption may ensure there is no cross-deployment access to KMS. In an embodiment, a message file includes a list of serialized GlobalMessageDPOs, the name of the next message file, and the diversifier to be utilizes for the next message file. A GlobalMessageDPO may point to one or more message body files. A message file may be encrypted with a random data encryption key (DEK) that may be generated by Java in one embodiment. The message body file may also be encrypted with a random DEK. Each DEK may be wrapped by a key derived from a Global Master Key (GMK) and the diversifier that was specified in the previous message file. Key derivation may be performed on the HSM using an HMAC algorithm. The derived key may be cached in global services such that it can be reutilized to wrap the next DEK if the diversifier has not changed. The wrapped DEK may be stored in the header of the message file in cloud storage. In an embodiment, the diversifier is a timestamp value that may be changed at any period of time, and for example may be changed every hour. Due to the timestamp, the target may reject diversifiers that are older than, for example, one day or some other suitable time period. This way, the target may enforce a set of less-granular properties on the diversifier.

FIG. 16 illustrates an encryption system 1600 for use in encryption replicated data. The encryption system 1600 includes an HSM (Hardware Security Module) Global Master Key (HSMGMK) 1602. The GSMGMK 1602 is provided to a plurality of deployments. For example, DEK1 is wrapped with HMAC at 1618, DEK2 is wrapped with a cached HMAC at 1620, and DEK3 is wrapped with a new HMAC at 1622. The DEK1 next file 1604 is fed to the DEK2 next file 1606, which is further fed to the DEK3 next file 1608. The message file includes a list of GlobalMessageD-POs (1614a, 1614b, 1614c), the name, and the diversifier (1610, 1612a, 1612b) for the next message file. The GlobalMessageDPOs 1614a, 1614b, 1614c point to zero or more message body files 1616a-1616e in one embodiment. In an embodiment, each message body file 1616a-1616e is encrypted with a random DEK and each DEK is wrapped by a key derived from the HMSGMK and diversifier of a previous message file. As illustrated in FIG. 16, message body file 1616a is encrypted with DEK4, message body file 1616b is encrypted with DEK5, message body file 1616c is encrypted with DEK6, message body file 1616d is encrypted with DEK7, and message body file 1616e is encrypted with DEK8. The wrapped DEK may be stored in the message file's header on cloud storage. The derived key may be cached and reutilized. Further, the next diversifier 1610, 1612a, 1612b may be changed at any suitable time interval, for example every hour.

Figure 17:
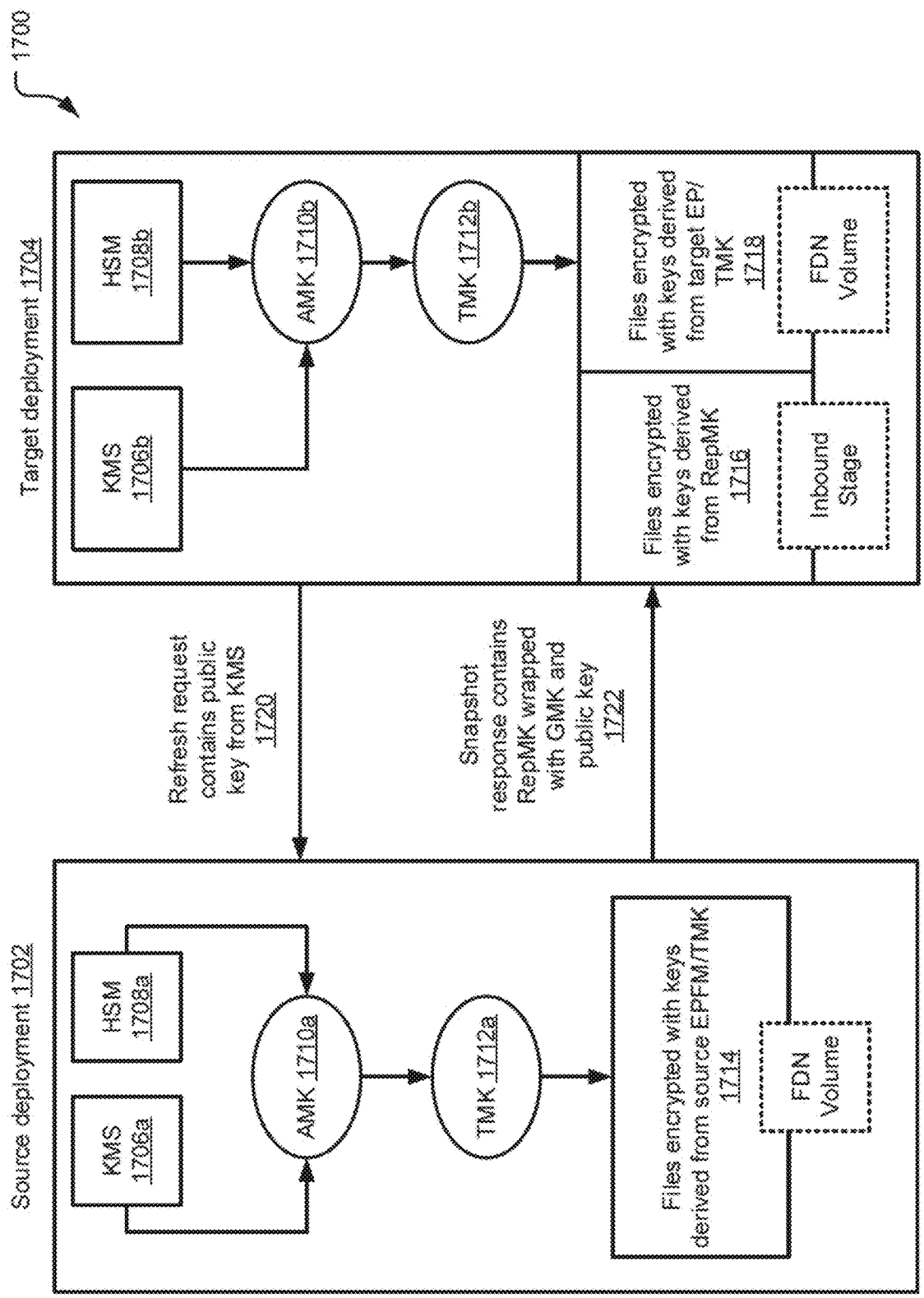
FIG. 17 illustrates a schematic diagram of an encryption system in accordance with the teachings and principles of the disclosure.

FIG. 17 is a schematic diagram illustrating an encryption 1700 of files utilizing a client managed key for replicating a database. When replicating data, the metadata files and micro-partitions from the source deployment are copied to the target deployment. In an embodiment, this involves two copy operations. First, the files are copied from the micro-partition volume of the source deployment to the inbound stage of the target deployment. Second, the files are copied from the inbound stage of the target deployment to the micro-partition volume of the target deployment. The double copy is necessary in an embodiment where the micro-partition volumes cannot be accessed across deployments directly, and thus the inbound stage is detoured on the target deployment.

In an embodiment, data replication is triggered by a refresh request 900 from the target deployment to the source deployment. The refresh request 900 is answered by a snapshot response 1000 generated by the source deployment. The snapshot response 1000 includes, in the message body file, a snapshot of the dictionary metadata including, for example, schema DPOs, table DPOs, and so forth, along with a list of metadata file names, and a random Replication Master Key (RepMK). The RepMK is generated by the source deployment's HSM. In an embodiment, each copy operation includes re-encrypting all files. When the files are copied into the inbound volume, the files are re-encrypted with an individual key derived from RepMK and each file's filename. When the files are copied into the target micro-partition volume, the files are re-encrypted with the respective metadata file master keys and table master keys of the customer account on the target deployment. In an embodiment, RepMK is wrapped utilizing HSMGMK before being sent as part of the snapshot response.

In an embodiment, when replication a file of a client account that utilizes customer-managed keys, the refresh request 900 includes a public key. The public key is part of a public-private key pair that is generated utilizing the customer KMS key on the target deployment. The wrapped RepMK in the snapshot response 1000 is additionally wrapped by the public key before being sent. Thus, in an embodiment, the RepMK is wrapped twice: first by the HSMGMK and second by the public key. During the second copy from the inbound stage to the target micro-partition volume, the RepMK is first unwrapped utilizing the private key and then unwrapped utilizing the HSMGMK.

As illustrated in FIG. 17, the source deployment 1702 includes a KMS 1706a and an HSM 1708a. The KMS 1706a and the HSM 1708a are utilized to generate the AMK 1710a and the TMK 1712a. The files are encrypted with keys derived from the source EPFM/TMK at 1714. The target deployment 1704 includes its own KMS 1706*b* and HSM 1708*b* that are utilized to generate the AMK 1710*b* and TMK 1712*b*. The files are encrypted with keys derived from the RepMK at 1716 at the inbound stage, and the files are encrypted with keys derived from the target EP/TMK at 1718 at the micro-partition volume. The refresh request includes a public key from KMS at 1720 when sent to the source deployment 1702 from the target deployment 1704. The snapshot response includes the RepMK wrapped with the HSMGMK and a public key at 1722 generated by the source deployment 1702 and transmitted to the target deployment 1704. As illustrated, the refresh request includes a public key derived from a customer KMS key on the target deployment and the snapshot response includes a random RepMK double wrapped with HSMGMK and the public key. The files in the inbound stage are encrypted with an individual key derived from the RepMK and each file's filename. Further in an embodiment, files in the micro-partition volume (source or target) are encrypted as usual utilizing a metadata file master key and table master key.

Figure 18:
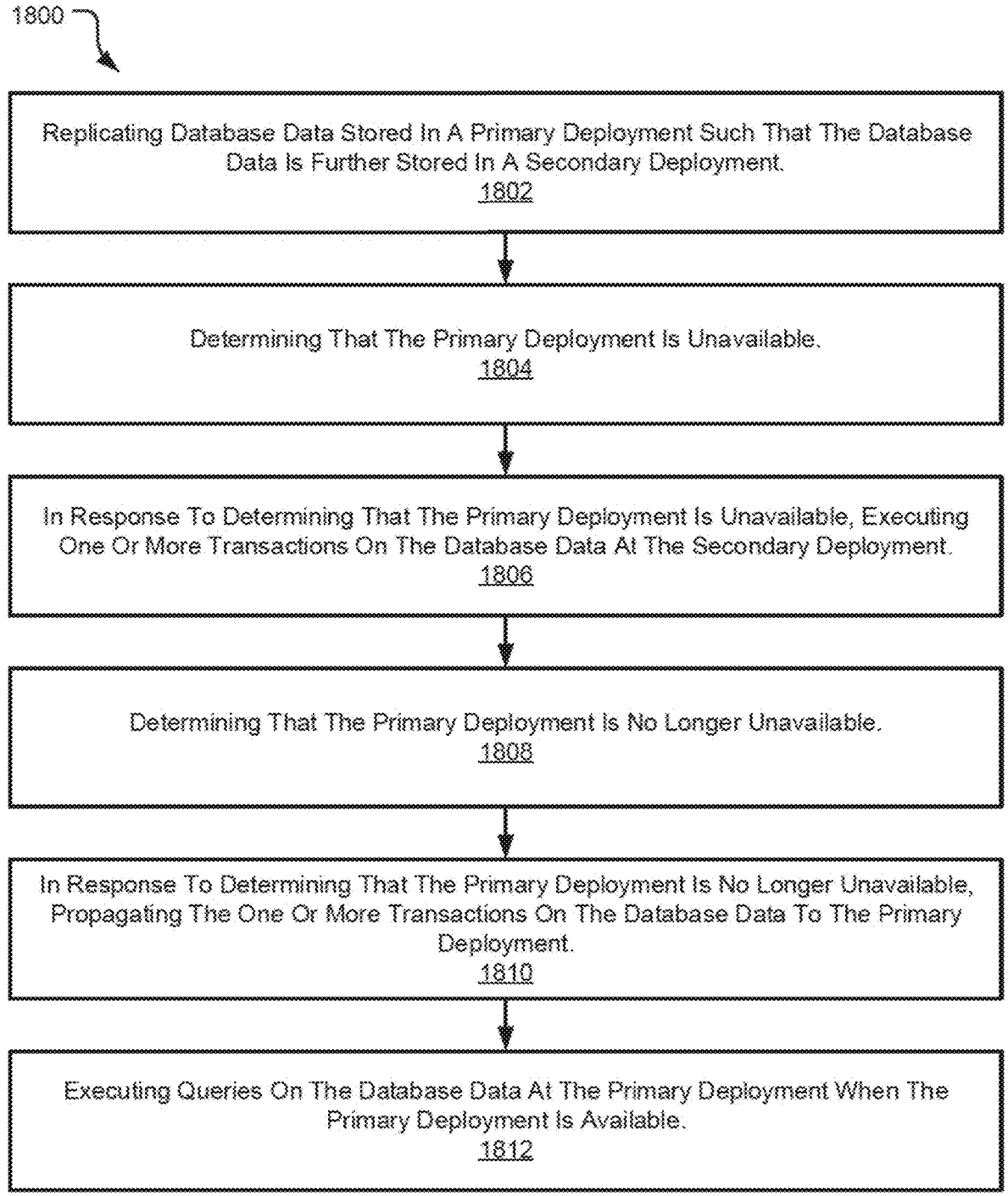
FIG. 18 illustrates a schematic flow chart diagram of a method for database failover in accordance with the teachings and principles of the disclosure.

FIG. 18 is a schematic flow chart diagram of a method 1800 for failover of a database between a primary deployment and a secondary deployment. The method 1800 may be executed by one or more computing resources such as a resource manager 102, execution platform 112, and/or replication and failover manager 228 as disclosed herein.

The method 1800 begins and a computing resource replicates at 1802 database data stored in a primary deployment such that the database data is further stored in a secondary deployment. The method 1800 continues and a computing resource determines at 1804 that the primary deployment is unavailable. The primary deployment may be unavailable due to, for example, a power outage, an error resulting in improper modification or deletion of database data at the primary deployment, a data center outage, a cloud provider outage, an error, a scheduled downtime, and so forth. The method 1800 continues and a computing resource executes at 1806 one or more transactions on the database data at the secondary deployment in response to determining that the primary deployment is unavailable. The one or more transactions may include a data manipulation language (DML) statement such as an insert, delete, update, and/or merge command, a query executed on the database data, and so forth. The method 1800 continues and a computing resource determines at 1808 that the primary deployment is no longer unavailable and has returned to an available state. The method 1800 continues and a computing resource propagates at 1810 the one or more transactions on the database data to the primary deployment in response to determining that the primary deployment is again available. In an embodiment, the one or more transactions are propagated to the primary deployment by way of a hybrid replication approach as disclosed herein. In an embodiment, the one or more transactions that were executed on the secondary deployment are determined by way of a transaction log written to the database as disclosed in, for example, FIGS. 6-8. In an embodiment, the primary deployment is refreshed according to the disclosures provided in FIGS. 9-11. The method 1800 is such that a computing resource, such as the resource manager 102 and/or the execution platform 112, executes queries on the database data at the primary deployment when the primary deployment is available (see 1812).

Figure 19:
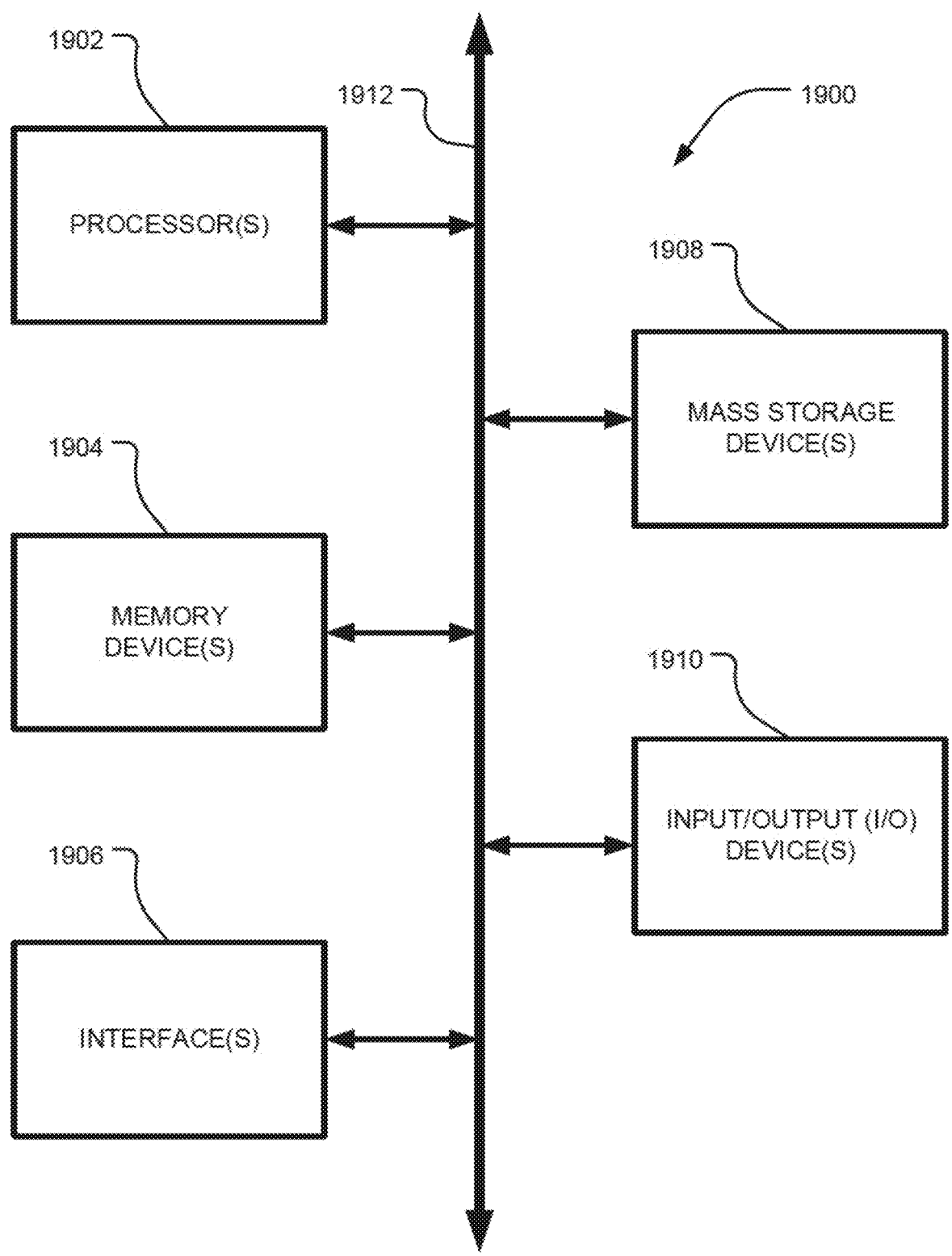
FIG. 19 illustrates an example computing device in accordance with the teachings and principles of the disclosure.

FIG. 19 is a block diagram depicting an example computing device 1900. In some embodiments, computing device 1900 is used to implement one or more of the systems and components discussed herein. For example, computing device 1900 may allow a user or administrator to access the resource manager 1902. Further, computing device 1900 may interact with any of the systems and components described herein. Accordingly, computing device 1900 may be used to perform various procedures and tasks, such as those discussed herein. Computing device 1900 can function as a server, a client or any other computing entity. Computing device 1900 can be any of a wide variety of computing devices, such as a desktop computer, a notebook computer, a server computer, a handheld computer, a tablet, and the like.

Computing device 1900 includes one or more processor(s) 1902, one or more memory device(s) 1904, one or more interface(s) 1906, one or more mass storage device(s) 1908, and one or more Input/Output (I/O) device(s) 1910, all of which are coupled to a bus 1912. Processor(s) 1902 include one or more processors or controllers that execute instructions stored in memory device(s) 1904 and/or mass storage device(s) 1908. Processor(s) 1902 may also include various types of computer-readable media, such as cache memory.

Memory device(s) 1904 include various computer-readable media, such as volatile memory (e.g., random access memory (RAM)) and/or nonvolatile memory (e.g., read-only memory (ROM)). Memory device(s) 1904 may also include rewritable ROM, such as Flash memory.

Mass storage device(s) 1908 include various computer readable media, such as magnetic tapes, magnetic disks, optical disks, solid state memory (e.g., Flash memory), and so forth. Various drives may also be included in mass storage device(s) 1908 to enable reading from and/or writing to the various computer readable media. Mass storage device(s) 1908 include removable media and/or non-removable media.

I/O device(s) 1910 include various devices that allow data and/or other information to be input to or retrieved from computing device 1900. Example I/O device(s) 1910 include cursor control devices, keyboards, keypads, microphones, monitors or other display devices, speakers, printers, network interface cards, modems, lenses, CCDs or other image capture devices, and the like.

Interface(s) 1906 include various interfaces that allow computing device 1900 to interact with other systems, devices, or computing environments. Example interface(s) 1906 include any number of different network interfaces, such as interfaces to local area networks (LANs), wide area networks (WANs), wireless networks, and the Internet.

Bus 1912 allows processor(s) 1902, memory device(s) 1904, interface(s) 1906, mass storage device(s) 1908, and I/O device(s) 1910 to communicate with one another, as well as other devices or components coupled to bus 1912. Bus 1912 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1900 and are executed by processor(s) 1902. Alternatively, the systems and procedures described herein can be implemented in hardware, or a combination of hardware, software, and/or firmware. For example, one or more application specific integrated circuits (ASICs) can be programmed to carry out one or more of the systems and procedures described herein. As used herein, the term "module" is intended convey the implementation apparatus for accomplishing a process, such as by hardware, or a combination of hardware, software, and/or firmware, for the purposes of performing all or parts of query operations.

EXAMPLES

The following examples pertain to further embodiments.

Example 1 is a system. The system includes means for replicating database data stored in a primary deployment such that the database data is further stored in a secondary deployment. The system includes means for determining that the primary deployment is unavailable. The system includes means for executing one or more transactions on the database data at the secondary deployment in response to determining that the primary deployment is unavailable. The system includes means for determining that that the primary deployment is no longer unavailable. The system includes means for propagating the one or more transactions on the database data to the primary deployment in response to determining that the primary deployment is no longer unavailable. The system includes means for executing queries on the database data at the primary deployment when the primary deployment is available.

Example 2 is a system as in Example 1, further comprising means for executing new transactions on the database data at the primary deployment and the secondary deployment when each of the primary deployment and the secondary deployment is available.

Example 3 is a system as in any of Examples 1-2, further comprising means for shifting executing of queries on the database data from the primary deployment to the secondary deployment for a duration of time the primary deployment is unavailable.

Example 4 is a system as in any of Examples 1-3, wherein the primary deployment and the secondary deployment are located in different geographic locations.

Example 5 is a system as in any of Examples 1-4, wherein the primary deployment and the secondary deployment are provided by different could-based storage providers.

Example 6 is a system as in any of Examples 1-5, further comprising means for providing a notification to an account associated with the database data when an availability status of either of the primary deployment or the secondary deployment has changed.

Example 7 is a system as in any of Examples 1-6, further comprising means for adhering to a user-defined maximum acceptable time period for the second deployment to become available for executing queries on the database data after the primary deployment is determined to be unavailable.

Example 8 is a system as in any of Examples 1-7, wherein the means for determining that the primary deployment is unavailable comprises means for determining one or more of: a power outage has occurred at the primary deployment, an error resulting in improper modification or deletion of the database data at the primary deployment has occurred, a data center outage has occurred at the primary deployment, a cloud provider of the primary deployment has experienced an outage, an error has occurred at the primary deployment, or the primary deployment is undergoing scheduled downtime.

Example 9 is a system as in any of Examples 1-8, further comprising means for adhering to a user-defined maximum number of database transactions an application may tolerate losing when shifting database operations from the primary deployment to the secondary deployment in response to the primary deployment becoming unavailable.

Example 10 is a system as in any of Examples 1-9, wherein the means for replicating the database data stored in the primary deployment is configured to replicate in response to the primary deployment becoming unavailable.

Example 11 is a system as in any of Examples 1-10, further comprising means for shifting a client account connection from the primary deployment to the secondary deployment in response to the primary deployment becoming unavailable.

Example 12 is a system as in any of Examples 1-11, wherein the means for propagating the one or more transactions to the primary deployment is configured to propagate only the one or more transactions and to not replicate any data already existing in the primary deployment before the primary deployment became unavailable.

Example 13 is a system as in any of Examples 1-12, wherein the means for propagating the one or more transactions to the primary deployment is configured to determine the one or more transactions based on a global file identifier indicating which files in the database data have been updated since the primary deployment became unavailable.

Example 14 is a method. The method includes replicating database data stored in a primary deployment such that the database data is further stored in a secondary deployment. The method includes, in response to determining that the primary deployment is unavailable, executing one or more transactions on the database data at the secondary deployment. The method includes, in response to determining that the primary deployment is no longer unavailable, propagating the one or more transactions on the database data to the primary deployment. The method is such that queries are executed on the database data at the primary deployment when the primary deployment is available.

Example 15 is a method as in Example 14, further comprising, when each of the primary deployment and the secondary deployment is available, executing new transactions on the database data at the primary deployment and the secondary deployment.

Example 16 is a method as in any of Examples 14-15, further comprising, in response to determining that the primary deployment is unavailable, shifting execution of queries on the database data from the primary deployment to the secondary deployment for a duration of time the primary deployment is unavailable.

Example 17 is a method as in any of Examples 14-16, wherein the shifting of execution of queries from the primary deployment to the secondary deployment occurs within a user-defined maximum acceptable time period for the secondary deployment to become available for executing queries after the primary deployment is determined to be unavailable.

Example 18 is a method as in any of Examples 14-17, further comprising determining that the primary deployment is unavailable by determining one or more of: a power outage has occurred at the primary deployment, an error resulting in improper modification or deletion of the database data at the primary deployment has occurred, a data center outage has occurred at the primary deployment, a cloud provider of the primary deployment has experienced an outage, an error has occurred at the primary deployment, or the primary deployment is undergoing scheduled downtime.

Example 19 is a processor that is programmable to execute instructions stored in non-transitory computer readable storage media, the instructions comprising: replicating database data stored in a primary deployment such that the database data is further stored in a secondary deployment; in response to determining that the primary deployment is unavailable, executing one or more transactions on the database data at the secondary deployment; in response to determining that the primary deployment is no longer unavailable, propagating the one or more transactions on the database data to the primary deployment; and while the primary deployment is available, executing queries on the database data at the primary deployment.

Example 20 is a processor as in Example 19, wherein the instructions further comprise executing new transactions on the database data at the primary deployment and the secondary deployment when each of the primary deployment and the secondary deployment is available.

Example 21 is a processor as in any of Examples 19-20, wherein the instructions further comprise, in response to determining that the primary deployment is unavailable, shifting execution of queries on the database data from the primary deployment to the secondary deployment for a duration of time the primary deployment is unavailable.

Example 22 is a processor as in any of Examples 19-21, wherein the instructions further comprise determining that the primary deployment is unavailable by determining one or more of: a power outage has occurred at the primary deployment, an error resulting in improper modification or deletion of the database data at the primary deployment has occurred, a data center outage has occurred at the primary deployment, a cloud provider of the primary deployment has experienced an outage, an error has occurred at the primary deployment, or the primary deployment is undergoing scheduled downtime.

The systems and methods described herein allow data to be stored and accessed as a service that is separate from computing (or processing) resources. Even if no computing resources have been allocated from the execution platform, data is available to a virtual warehouse without requiring reloading of the data from a remote data source. Thus, data is available independently of the allocation of computing resources associated with the data. The described systems and methods are useful with any type of data. In particular embodiments, data is stored in a structured, optimized format. The decoupling of the data storage/access service from the computing services also simplifies the sharing of data among different users and groups. As discussed herein, each virtual warehouse can access any data to which it has access permissions, even at the same time as other virtual warehouses are accessing the same data. This architecture supports running queries without any actual data stored in the local cache. The systems and methods described herein are capable of transparent dynamic data movement, which moves data from a remote storage device to a local cache, as needed, in a manner that is transparent to the user of the system. Further, this architecture supports data sharing without prior data movement since any virtual warehouse can access any data due to the decoupling of the data storage service from the computing service.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

What is claimed is:

1. A system comprising:
a cache memory to store datasets; and
a processor, operatively coupled with the cache memory, to:
determine a first client account associated with a first request to perform a first transaction;
determine a second client account associated with a second request to perform a second transaction;
select, for the first request, a primary deployment that stores a first dataset responsive to determining the first client account associated with the first request;
select, for the second request, a secondary deployment that stores a second dataset that comprises the first dataset responsive to determining the second client account associated with the second request; and
execute, while the primary deployment and the secondary deployment are both available, the first transaction on the first dataset at the primary deployment and the second transaction on the second dataset at the secondary deployment.

2. The system of claim 1, wherein the processor to:
propagate the second transaction on the second dataset to the primary deployment; and
execute queries on the second dataset at the primary deployment.

3. The system of claim 1, wherein the processor to:
determine that the first dataset stored in the primary deployment is unavailable.

4. The system of claim 3, wherein to determine that the first dataset stored in the primary deployment is unavailable, the processor to:
determine that a power outage has occurred at the primary deployment, or
determine that an error resulting in improper modification or deletion of the first dataset at the primary deployment has occurred.

5. The system of claim 3, wherein to determine that the first dataset stored in the primary deployment is unavailable, the processor to:
determine that a data center outage has occurred at the primary deployment.

6. The system of claim 3, wherein to determine that the first dataset stored in the primary deployment is unavailable, the processor to:
determine that a cloud provider of the primary deployment has experienced an outage.

7. The system of claim 3, wherein to determine that the first dataset stored in the primary deployment is unavailable, the processor to:
determine that an error has occurred at the primary deployment.

8. The system of claim 3, wherein to determine that the first dataset stored in the primary deployment is unavailable, the processor to:
determine that the primary deployment is undergoing scheduled downtime.

9. The system of claim 1, wherein the first dataset stored on the primary deployment is an encrypted version of the first dataset that is generated based on a first encryption key and the second dataset stored on the secondary deployment is an encrypted version of the second dataset that is generated based on a second encryption key.

10. The system of claim 1, wherein the processor to:
copy the first dataset stored in the primary deployment to a first region of the secondary deployment to cause the secondary deployment to copy the first dataset to a second region of the secondary deployment.

11. A method, comprising:
   determining a first client account associated with a first request to perform a first transaction;
   determining a second client account associated with a second request to perform a second transaction;
   selecting, for the first request, a primary deployment that stores a first dataset responsive to determining the first client account associated with the first request;
   selecting, for the second request, a secondary deployment that stores a second dataset that comprises the first dataset responsive to determining the second client account associated with the second request; and
   executing, while the primary deployment and the secondary deployment are both available, the first transaction on the first dataset at the primary deployment and the second transaction on the second dataset at the secondary deployment.

12. The method of claim 11, further comprising:
   propagating the second transaction on the second dataset to the primary deployment; and
   executing queries on the second dataset at the primary deployment.

13. The method of claim 11, further comprising:
   determining that the first dataset stored in the primary deployment is unavailable.

14. The method of claim 13, wherein determining that the first dataset stored in the primary deployment is unavailable further comprises:
   determining that a power outage has occurred at the primary deployment; or
   determining that an error resulting in improper modification or deletion of the first dataset at the primary deployment has occurred.

15. The method of claim 13, wherein determining that the first dataset stored in the primary deployment is unavailable further comprises:
   determining that a data center outage has occurred at the primary deployment.

16. The method of claim 13, wherein determining that the first dataset stored in the primary deployment is unavailable further comprises:
   determining that a cloud provider of the primary deployment has experienced an outage.

17. The method of claim 13, wherein determining that the first dataset stored in the primary deployment is unavailable further comprises:
   determining that an error has occurred at the primary deployment.

18. The method of claim 13, wherein determining that the first dataset stored in the primary deployment is unavailable further comprises:
   determining that the primary deployment is undergoing scheduled downtime.

19. The method of claim 11, wherein the first dataset stored on the primary deployment is an encrypted version of the first dataset that is generated based on a first encryption key and the second dataset stored on the secondary deployment is an encrypted version of the second dataset that is generated based on a second encryption key.

20. The method of claim 11, further comprising:
   copying the first dataset stored in the primary deployment to a first region of the secondary deployment to cause the secondary deployment to copy the first dataset to a second region of the secondary deployment.

21. A non-transitory computer readable storage media comprising instructions that, when executed by a processor, cause the processor to:
   determine a first client account associated with a first request to perform a first transaction;
   determine a second client account associated with a second request to perform a second transaction;
   select, for the first request, a primary deployment that stores a first dataset responsive to determining the first client account associated with the first request;
   select, for the second request, a secondary deployment that stores a second dataset that comprises the first dataset responsive to determining the second client account associated with the second request; and
   execute, while the primary deployment and the secondary deployment are both available, the first transaction on the first dataset at the primary deployment and the second transaction on the second dataset at the secondary deployment.

22. The non-transitory computer readable storage media of claim 21, wherein the processor to:
   propagate the second transaction on the second dataset to the primary deployment; and
   execute queries on the second dataset at the primary deployment.

23. The non-transitory computer readable storage media of claim 21, wherein the processor to:
   determine that the first dataset in the primary deployment is unavailable.

24. The non-transitory computer readable storage media of claim 23, wherein to determine that the first dataset in the primary deployment is unavailable, the processor to:
   determine that a power outage has occurred at the primary deployment, or
   determine that an error resulting in improper modification or deletion of the first dataset at the primary deployment has occurred.

25. The non-transitory computer readable storage media of claim 23, wherein to determine that the first dataset in the primary deployment is unavailable, the processor to:
   determine that a data center outage has occurred at the primary deployment.

26. The non-transitory computer readable storage media of claim 23, wherein to determine that the first dataset in the primary deployment is unavailable, the processor to:
   determine that a cloud provider of the primary deployment has experienced an outage.

27. The non-transitory computer readable storage media of claim 23, wherein to determine that the first dataset in the primary deployment is unavailable, the processor to:
   determine that an error has occurred at the primary deployment.

28. The non-transitory computer readable storage media of claim 23, wherein to determine that the first dataset in the primary deployment is unavailable, the processor to:
   determine that the primary deployment is undergoing scheduled downtime.

29. The non-transitory computer readable storage media of claim 21, wherein the first dataset stored on the primary deployment is an encrypted version of the first dataset that is generated based on a first encryption key and the second dataset stored on the secondary deployment is an encrypted version of the second dataset that is generated based on a second encryption key.

30. The non-transitory computer readable storage media of claim 21, wherein the processor to:
   copy the first dataset stored in the primary deployment to a first region of the secondary deployment to cause the secondary deployment to copy the first dataset to a second region of the secondary deployment.

\* \* \* \* \*